US006134056A

United States Patent [19]
Nakamuka

[11] Patent Number: 6,134,056
[45] Date of Patent: Oct. 17, 2000

[54] OBJECTIVE LENS SYSTEM FOR ENDOSCOPES

[75] Inventor: Shinichi Nakamuka, Hachioji, Japan

[73] Assignee: Olympus Optical Co., Ltd., Tokyo, Japan

[21] Appl. No.: 09/495,291

[22] Filed: Feb. 1, 2000

Related U.S. Application Data

[63] Continuation of application No. PCT/JP98/03399, Jul. 30, 1998.

[30] Foreign Application Priority Data

Aug. 1, 1997 [JP] Japan ..................................... 9-219733

[51] Int. Cl.[7] .............................. G02B 9/12; G02B 13/04; G02B 21/02; A61B 1/00; A61B 1/06
[52] U.S. Cl. .......................... 359/784; 359/753; 359/660; 600/101; 600/176; 600/181
[58] Field of Search ..................................... 359/784, 753, 359/660, 661, 781, 782, 783; 600/176, 181, 101

[56] References Cited

U.S. PATENT DOCUMENTS

| | | | |
|---|---|---|---|
| 4,858,002 | 8/1989 | Zobel | 358/98 |
| 5,083,223 | 1/1992 | Igarashi | 359/708 |
| 5,954,633 | 9/1999 | Hirata | 600/108 |
| 6,038,079 | 3/2000 | Michaels | 359/661 |

FOREIGN PATENT DOCUMENTS

| | | |
|---|---|---|
| 64-33516 | 2/1989 | Japan . |
| 2-176612 | 7/1990 | Japan . |
| 4-276711 | 10/1992 | Japan . |
| 5-107471 | 4/1993 | Japan . |
| 5-127080 | 5/1993 | Japan . |
| 5-288986 | 11/1993 | Japan . |
| 5-297272 | 11/1993 | Japan . |
| 5-307139 | 11/1993 | Japan . |
| 7-84179 | 3/1995 | Japan . |
| 8-190046 | 7/1996 | Japan . |
| 9-68647 | 3/1997 | Japan . |

Primary Examiner—Georgia Epps
Assistant Examiner—David N. Spector
Attorney, Agent, or Firm—Pillsbury Madison & Sutro LLP

[57] ABSTRACT

An objective lens system for endoscopes comprising a first lens component ($L_1$) which has no or a negative refractive power, a second lens component ($L_2$) which has a convex image side surface and a third lens component ($L_3$) which has a convex object side surface, wherein a radius of curvature $r_{3F}$ on the object side surface of the third lens component and a thickness of the third lens component satisfy the following condition:

$$3 < r_{3F}/D_3 < 10.$$

8 Claims, 17 Drawing Sheets

SPHERICAL ABERRATION
F/4.71

ASTIGMATISM
IH 0.97

DISTORTION
IH 0.97

LATERAL CHROMATIC ABERRATION
IH 0.97

COMA
IH 0.97

OBJECTIVE LENS SYSTEM FOR ENDOSCOPES

This is a continuation of: International Appln. No. PCT/JP98/03399, filed Jul. 30, 1998.

TECHNICAL FIELD

The present invention relates to an objective lens system for endoscopes which is compact and has a wide field angle, and more specifically an objective lens system for endoscopes which is suited for use with electronic endoscopes.

BACKGROUND ART

A lens system disclosed by Japanese Patent Kokai Publication No. Hei 2-176612 is known as a conventional example of compact objective lens system for endoscopes. This conventional example has a composition shown in FIG. 27, wherein the objective lens system is composed, in order from the object side, of a first lens component $L_1$ which is a plane parallel cover glass plate, an aperture stop S, a second plano-convex lens component $L_2$ and a third plano-convex lens component $L_3$.

A lens system disclosed by U.S. Pat. No. 4,858,002 is known as another conventional example. This conventional example has a composition shown in FIG. 28, wherein the lens system is composed, in order from the object side, of an aperture stop S, a first meniscus lens component $L_1$ and a second plano-convex or meniscus lens component $L_2$.

Furthermore, a lens system disclosed by Japanese Patent Kokai Publication No. Sho 64-33516 is known as still another conventional example. This conventional example has a composition which is similar to that of the lens system disclosed by Japanese Patent Kokai Publication No. Hei 2-176612 and comprises an infrared absorption filter (color correction filter) disposed after the lens system as shown in FIG. 29. Speaking concretely, the lens system is composed, in order from the object side, of a first lens component $L_1$ which is a cover glass plate, an aperture stop S, a second lens component $L_2$, a third lens component $L_3$ and an infrared absorption filter F.

A CCD which is used for electronic endoscopes and the like has sensitivity in an infrared region. It is therefore necessary to insert an infrared absorption filter into an objective lens system for electronic endoscopes which uses a CCD in order to enhance color reproducibility.

The Japanese Patent Kokai Publication No. Hei 2-176612 and U.S. Pat. No. 4,858,002 disclose lens systems which use CCDs as image pickup means, but make no reference to an infrared absorption filter.

Furthermore, Japanese Patent Kokai Publication No. Sho 64-33516 discloses a lens system in which an infrared absorption filter F is disposed, but provide no description of a condition required for the lens system to dispose the infrared absorption filter effectively in a remarkably restricted space and freedom. Speaking more concretely, the infrared absorption filter F is disposed between the third lens component $L_3$ and the CCD as shown in FIG. 29 but the third lens component $L_3$ cannot be worked in this case since it has a small marginal thickness. Though no restriction is imposed on the lens system in a case where the infrared absorption filter before the aperture stop, a cover glass plate which is to be disposed at this location will have a large outside diameter in this case. Furthermore, optical path lengths in the filter are different between a central portion and a marginal portion of an image, thereby being apt to produce color ununiformity.

It is general to use an infrared absorption filter having a thickness of 0.5 mm to 2 mm, which remains unchanged even for a compact CCD. Accordingly, a space for the infrared absorption filter is narrower as a lens system uses a CCD which is more compact. In order to prevent flare from being produced by an infrared semiconductor laser beam which has a high output for medical treatment, for example, an infrared absorption filter which is an thick as possible is preferable, thereby making it necessary to reserve a large space.

Furthermore, the conventional examples disclosed by Japanese Patent Kokai Publication No. Hei 2-176612 and U.S. Pat. No. 4,858,002 have field angles which are not so large and these publications provide no description of any means to correct lateral chromatic aberration which is problematic in objective lens systems having remarkably large field angles exceeding 120°.

The present invention has an object to provide an objective lens system which is not enlarged by disposing an infrared absorption filter required for electronic endoscopes, has a remarkably large field angle and favorably corrects lateral chromatic aberration.

DISCLOSURE OF THE INVENTION

The objective lens system for endoscopes is characterized in that it comprises, in order from the object side, a first lens component which has no refractive power, a second lens component and a third lens component, that the second lens component has an image side surface which is convex toward the image side, and that the third lens component has an object side surface which is convex toward the object side and satisfies the following condition (1):

$$3 < r_{3F}/D_3 < 10 \tag{1}$$

wherein the reference symbol $r_{3F}$ represents a radius of curvature on the object side surface of the third lens component and the reference symbol $D_3$ designates a thickness of the third lens component.

The objective lens system for endoscopes according to the present invention is characterized in that it comprises, in order from the object side, a first lens component which has a negative refractive power, a second lens component and a third lens component, that the second lens component has an image side surface which is convex toward the image side, and that the third lens component has an object side surface which is convex toward the object side and satisfies the following condition (1-1):

$$4.37 < r_{3F}/D_3 < 10 \tag{1-1}$$

BEST MODE TO EMBODY THE INVENTION

Figure 1:
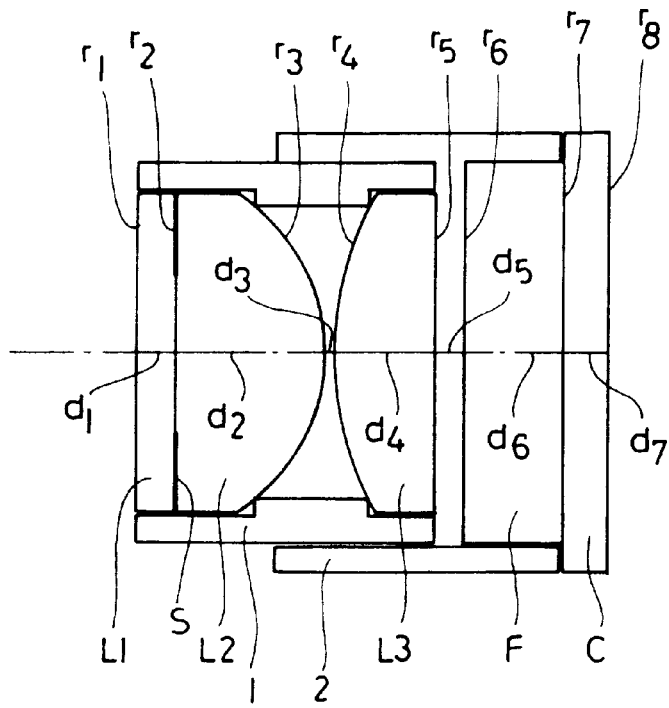
FIG. 1 is a sectional view illustrating a composition of a first embodiment of the objective lens system for endoscopes according to the present invention.

The objective lens system according to the present invention has a composition such as that shown in FIG. 1, for example, and is characterized by comprising, in order from the object side, a first lens component $L_1$ which is a cover glass plate (having no refractive power), an aperture stop S, a second plano-convex lens component $L_2$, a third plano-convex lens component $L_3$, an infrared absorption filter F and a CCD cover glass plate C. Furthermore, the objective lens system is characterized in that the third lens component $L_3$ satisfies the following condition (1):

$$3 < r_{3F}/D_3 < 10 \qquad (1)$$

wherein the reference symbol $r_{3F}$ represents a radius of curvature on an object side surface of the third lens component and the reference symbol $D_3$ designates a thickness of the third lens component.

Figure 18:
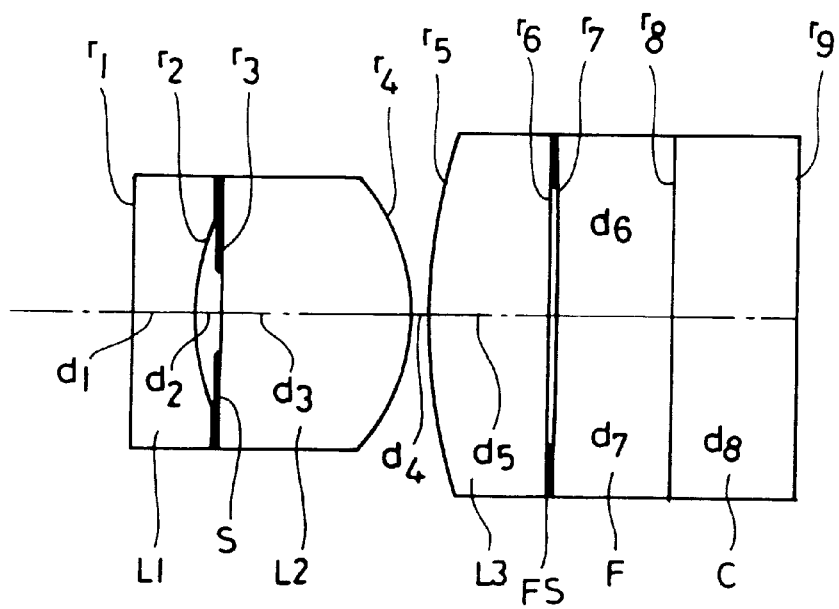
FIG. 18 is a sectional view illustrating a composition of an eighteenth embodiment of the objective lens system for endoscopes according to the present invention.

Furthermore, the objective lens system for endoscopes according to the present invention is characterized by comprising, in order from the object side for example as shown in FIG. 18, a first plano-concave lens component $L_1$ (having a negative refractive power), an aperture stop S, a second plano-convex lens component $L_2$, a third plano-convex lens component $L_3$, an infrared absorption filter F and a CCD cover glass plate C, and that the third lens component $L_3$ satisfies the following condition (1-1):

$$4.37 < r_{3F}/D_3 < 10 \qquad (1\text{-}1)$$

Figure 24:
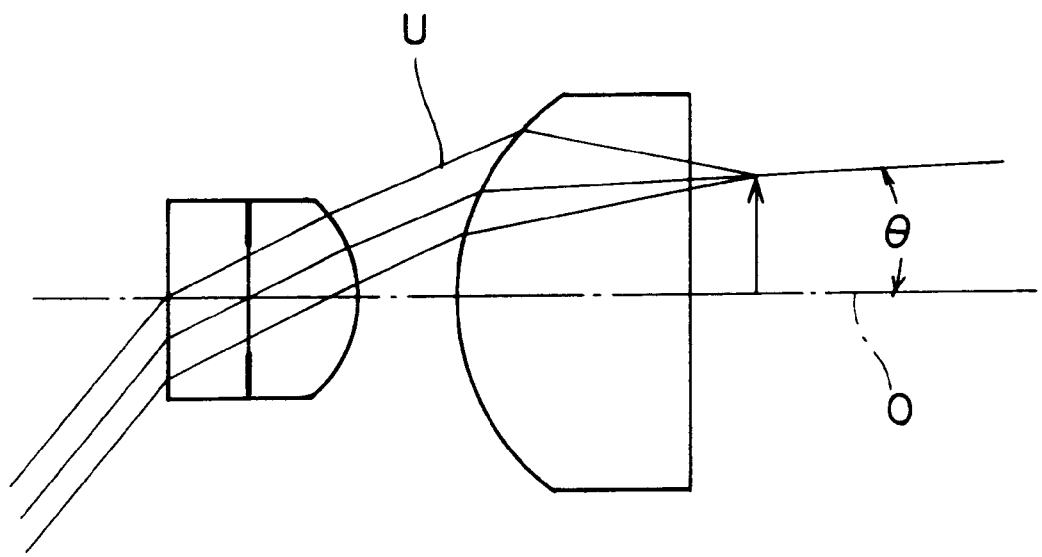
FIG. 24 is a sectional view illustrating a conditions of emerging rays from a conventional objective lens system for endoscopes.

The condition (1) or (1-1) is required for disposing the infrared absorption filter between the third lens component and the CCD cover glass plate. For disposing the infrared absorption filer between the third lens component and the CCD cover glass plate, it is sufficient to thin the third lens component. When the third lens component has a small thickness, however, the lens component has a marginal thickness which is insufficient for working. Therefore, the present invention selects a large radius of curvature for the object side surface of the third lens component so that the lens component has a large marginal thickness. Furthermore, the present invention selects a large inclination angle for an emerging principal ray by degrading a telecentric condition so that the third lens component has a small outside diameter and a required marginal thickness. On the other hand, a conventional objective lens system for endoscopes is a telecentric optical system which allows a principal ray to emerge at an small inclination angle θ as shown in FIG. 24.

Figure 25:
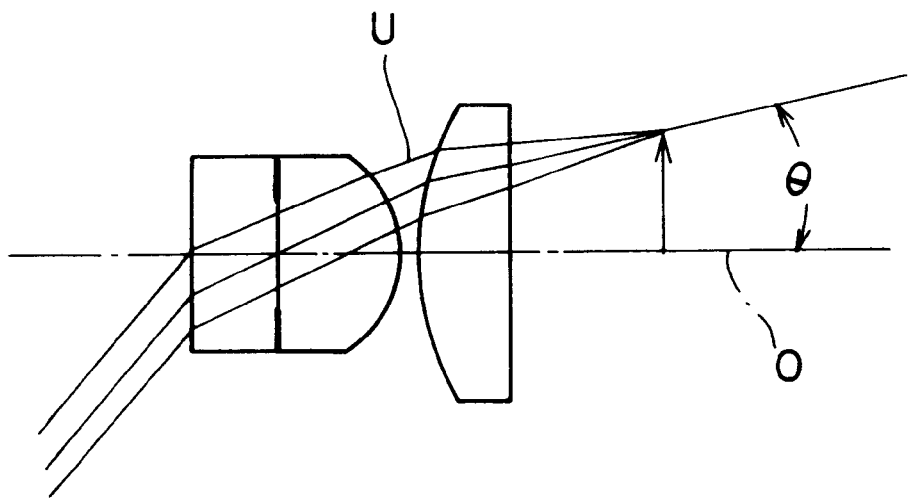
FIG. 25 is a sectional view illustrating conditions of emerging rays from the objective lens system for endoscope according to the present invention.

The objective lens system according to the present invention is configured to allow the principal ray to emerge at a large inclination angle θ as shown in FIG. 25.

It is desirable that the inclination angle θ of the emerging principal ray is determined at a value at which an upper offaxial emerging ray U which travels toward a maximum image height is in parallel with an optical axis O or a higher value, preferably at 8° larger, more preferably at 10° or larger. When the emerging principal ray emerges at an inclination angle θ within a range up to about 25° it is possible to prevent shading by using an on-chip type organic color filter CCD or a CCD with a micro lens.

If $r_{3F}/D_3$ has a value not larger than the lower limit of 3 of the condition (1) or the lower limit of 4.37 of the condition (1-1), it will be impossible to dispose an infrared absorption filter which is sufficiently thick. A value of $r_{3F}/D_3$ which is not smaller than 4 in the condition (1) is preferable since such a value makes it possible to disposed an infrared absorption filter which is sufficiently thick. If a value of $r_{3F}/D_3$ has a value not smaller than the upper limit of 10 of the condition (1) or the condition (1-1), the second lens component will have an insufficient marginal thickness and cannot be worked or a power of the second lens component will be insufficient and the emerging principal ray will have a large inclination angle, thereby allowing shading to be produced.

Furthermore, it is desirable that the objective lens system according to the present invention satisfies the following condition (2):

$$D_{23}/f<0.15 \qquad (2)$$

wherein the reference symbol $D_{23}$ represents a distance between the second lens component and the third lens component, and the reference symbol f designates a focal length of the objective lens system as a whole.

The condition (2) is required to further enlarging the space after the third lens component and suppress curvature of field on a sagittal image surface.

If the upper limit of 0.15 of the condition (2) is exceeded, it will be impossible to reserve a sufficient space after the third lens component. Furthermore, if the upper limit is exceeded, curvature of field will be more remarkable when the objective lens system has a wide field angle exceeding 120° in particular. It is more desirable to modify the upper limit of the condition (2) to 0.12 or satisfy the following condition (2-1):

$$D_{23}/f<0.12 \qquad (2-1)$$

Furthermore, it is desirable that the objective lens system according to the present invention to satisfy, in addition to the condition (1), the following condition (3):

$$2.0<f_3/f<5 \qquad (3)$$

wherein the reference symbol $f_3$ represents a focal length of the third lens component.

If the lower limit of 2.0 of the condition (3) is exceeded, the emerging principal ray will have a small inclination angle, thereby undesirably enlarging an outside diameter of the third lens component. A value of $f_9/f$ which is not smaller than 2.5 is preferable since it makes it possible to shorten an outside diameter of the third lens component. If the upper limit of 5 of the condition (3) is exceeded, the emerging principal ray will have a large inclination angle, thereby undesirably allowing color shading to be produced.

When the object side surface of the second lens component is configured as a concave surface in the objective lens system according to the present invention as in an eighth embodiment described later (FIG. 8), for example, it is desirable to satisfy the following condition (4):

$$0.3<f_3/f_2<0.7 \qquad (4)$$

wherein the reference symbol $f_2$ represents a focal length of the second lens component.

The condition (4) is required to prolong a back focal length, thereby reserving a larger space after the third lens component. If the lower limit of 0.3 of the condition (4) is exceeded, the third lens component will have a strong power, thereby having a large outside diameter. If the upper limit of 0.7 of the condition (4) is exceeded, in contrast, it will be impossible to reserve a sufficient back focal length.

Furthermore, it is more desirable to modify the upper limit of the condition (4) to 0.65 or satisfy the following condition (4-1):

$$0.3<f_3/f_2<0.65 \qquad (4-1)$$

It is preferable to adjust a focus condition of the objective lens system according to the present invention by varying an airspace reserved after the third lens component, for example, as in a first embodiment (FIG. 1) described later.

It is conventional to adjust a focus condition of an objective lens system for endoscopes which has a composition such as that shown in FIG. 1 mostly by varying an air space reserved between a second lens component and a third lens component. However, such a focus condition adjustment method is not preferable since the method allows a field angle to be varied by moving the lens components. Furthermore, the method is not preferable from viewpoints of reservation of a space to dispose a filter and correction of curvature of field since the method moves a focus point for a distance which is short as compared with moving distances of the lens components, thereby requiring a large airspace between the second lens component and the third lens component.

The objective lens system for endoscopes according to the present invention which has another second composition it characterized in that it comprises, in order from the object side, a first lens component which has no refractive power or a negative refractive power, a second lens component and a third lens component, that the second lens component has a planar object side surface and an image side surface which is convex toward the object side, that the third lens component has an object side surface which is convex toward the object side, and that the objective lens system satisfies the following condition (5):

$$\nu>45 \qquad (5)$$

wherein the reference symbol ν represents an Abbe's number of the second lens component or the third lens component.

The spherical objective lens system disclosed by Japanese Patent Kokai Publication No. Hei 2-176612 has an Abbe's number not larger than 41 and produces lateral chromatic aberration remarkably when the lens system has a wide field angle of 120° or larger.

The condition (5) is required to suppress lateral chromatic aberration. It is preferable to use a glass material which is within a range A in particular of a glass map shown in FIG. 26. For the lens system according to the present invention, it is more preferable to use a glass material within a range B shown in FIG. 26 since the glass material prevents a Petzval's sum from being so large.

Figure 26A:
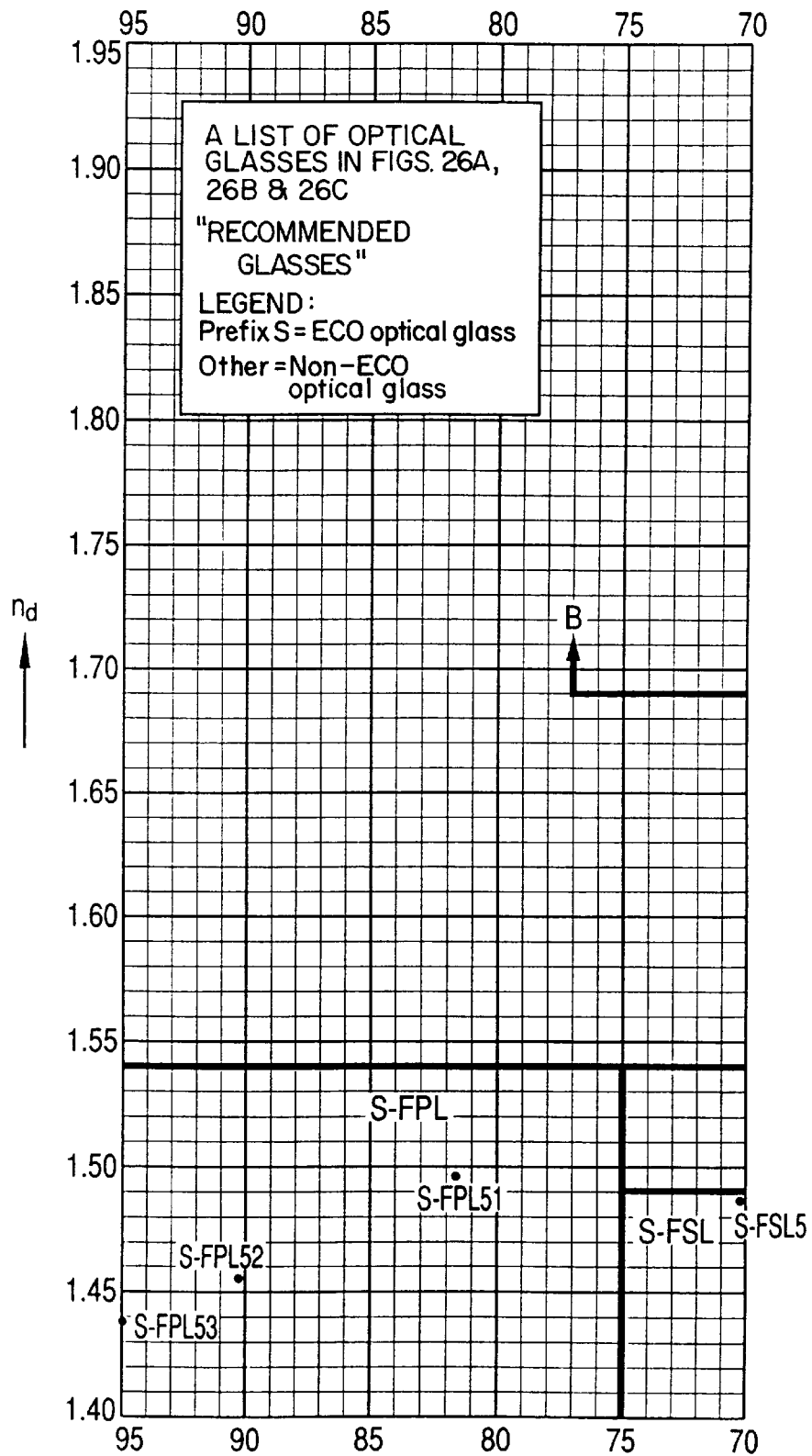
FIG. 26 is a map of optical glass materials.
Figure 26B:
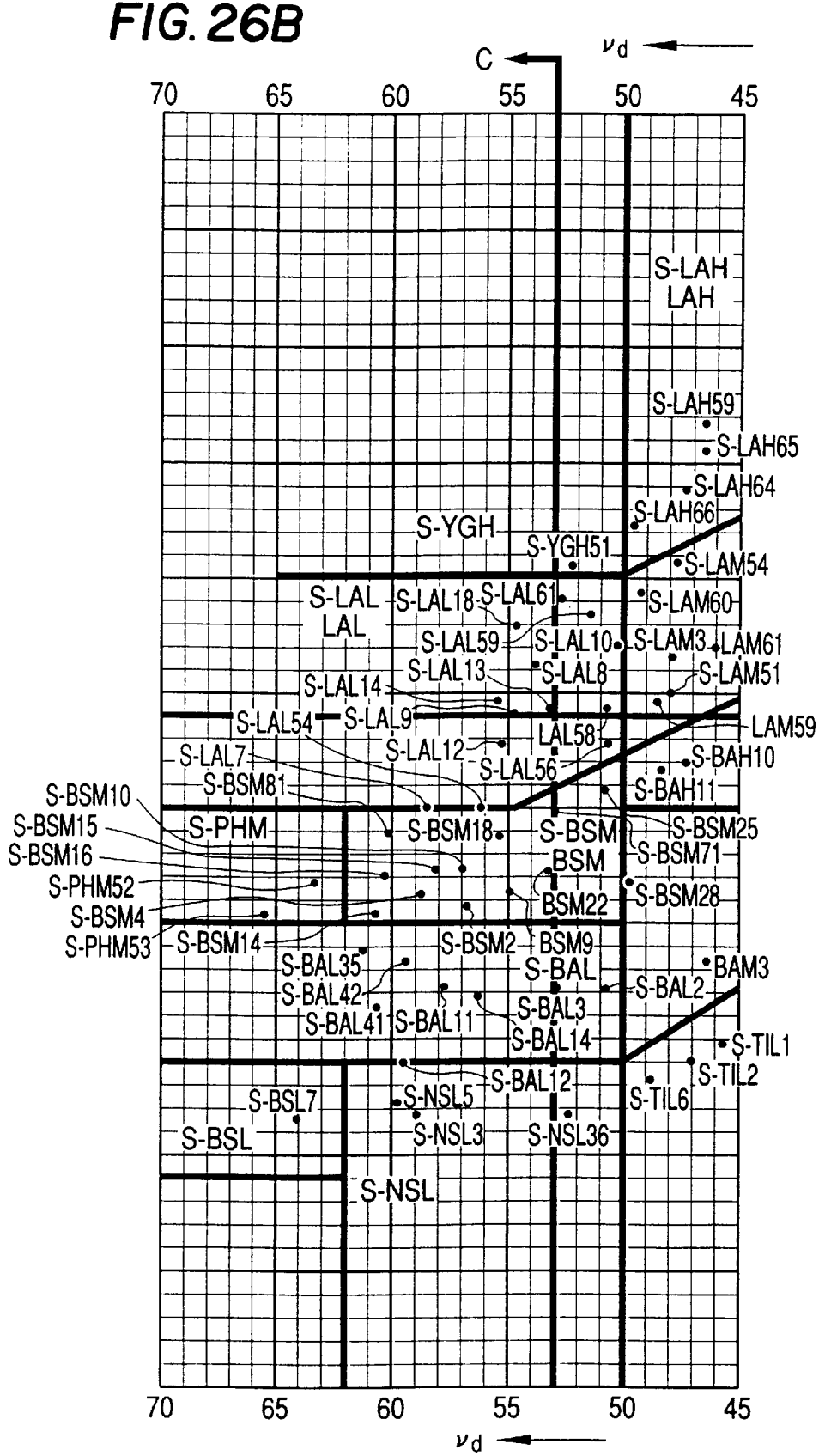
Figure 26C:
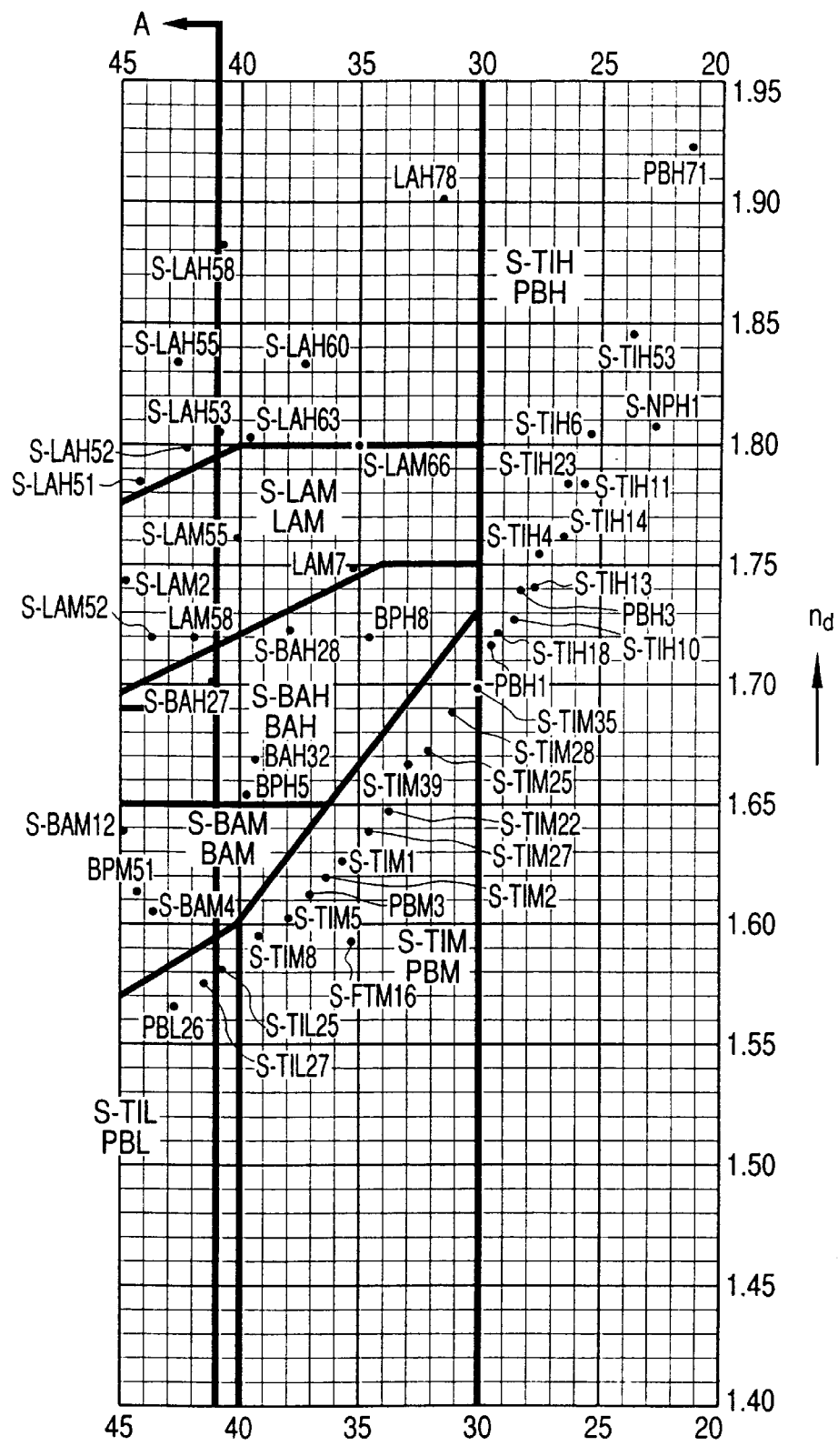
Figure 27:
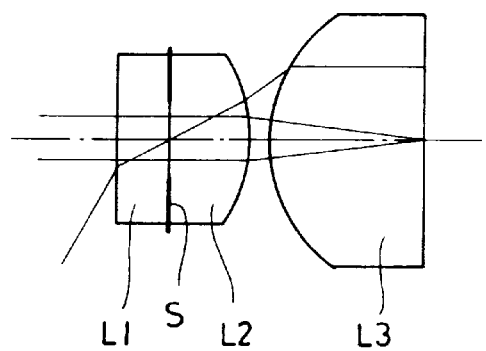
FIG. 27 is a sectional view illustrating a composition of a conventional objective lens system for endoscopes.
Figure 28:
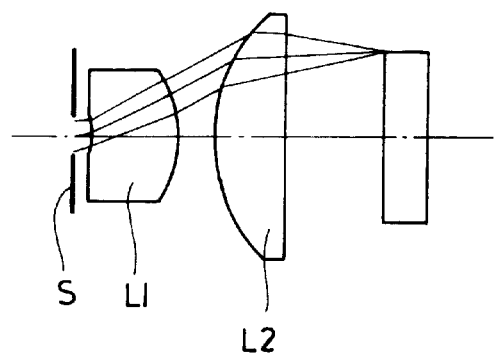
FIG. 28 is a sectional view illustrating a composition of another conventional objective lens system for endoscopes.
Figure 29:
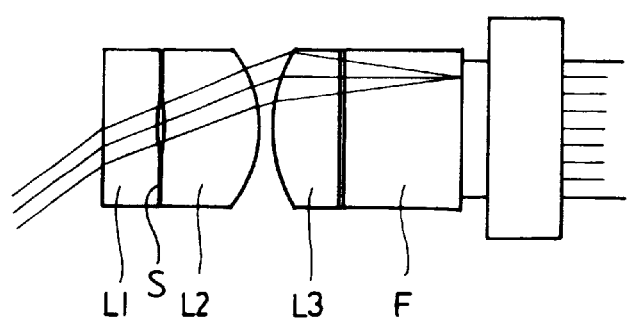
FIG. 29 is a sectional view illustrating a composition of still another conventional objective lens system for endoscopes.

FIG. 26 is prepared by tracing the ranges A, B and C on a diagram which is quoted directly from a catalog of Ohara, Co., Ltd.

Since lateral chromatic aberration is produced mainly by the third lens component, it is desirable in particular that the third lens component satisfies the condition (5).

For reasons which are the same as those which have already been described above, it is preferable that the objective lens system according to the present invention which has the second composition also satisfies the conditions (2) and (3) mentioned above.

Furthermore, the objective lens system for endoscopes according to the present invention which has a third composition is characterized in that it comprises, in order from the object side, a first lens component which has no or negative refractive power, a second lens component which has an object side surface concave toward the object side and an image side surface convex toward the image side, and a third lens component which has an object side surface convex toward the object side and satisfies the following condition (5-1).

$$\nu > 53 \qquad (5\text{-}1)$$

The objective lens system disclosed by U.S. Pat. No. 4,858,002 has an Abbe's number not larger than 50 and produces remarkable lateral chromatic aberration when the lens system has a wide field angle of 120° or larger.

The objective lens system according to the present invention which has the third composition satisfies the condition (5-1) and is therefore capable of favorably correcting lateral chromatic aberration though it is configured to have a wide field angle not smaller than 120°. It is desirable for any one of the lens components to use a glass material within the range C of the glass map shown in FIG. 26. It is more desirable to use a glass material within the range B which has a higher refractive index and can prevent a Petzval's sum from being not so large.

Since lateral chromatic aberration is produced mainly by the third lens component in the objective lens system described above, it is more desirable for the third lens component to use a glass material which satisfies the condition (5-1). When such a glass material is used for the third lens component, it is desirable for the reason described above to satisfy the conditions (2) and (3) at the same time.

Now, numeral data will be described below as embodiments of the present invention;

Embodiment 1
f = 1.000, F/4.710, IH = 0.969,
object distance = 8.847, 2ω = 133.0°

$r_1 = \infty$
$\quad d_1 = 0.2359 \quad n_1 = 1.51633 \quad \nu_1 = 64.15$
$r_2 = \infty$ (stop)
$\quad d_2 = 0.9008 \quad n_2 = 1.72916 \quad \nu_2 = 54.68$
$r_3 = -1.1194$
$\quad d_3 = 0.0590$
$r_4 = 2.0113$
$\quad d_4 = 0.5898 \quad n_3 = 1.72916 \quad \nu_3 = 54.68$
$r_5 = \infty$
$\quad d_5 = 0.1699$
$r_6 = \infty$
$\quad d_6 = 0.5898 \quad n_4 = 1.49400 \quad \nu_4 = 75.00$
$r_7 = \infty$
$\quad d_7 = 0.2632 \quad n_5 = 1.52287 \quad \nu_5 = 59.89$
$r_8 = \infty$
$D_{23}/f = 0.059, f_3/f = 2.758, r_{3F}/D_3 = 3.410$ Embodiment 2
f = 1.000, F/5.000, IH = 1.023,
object distance = 10.006, 2ω = 132.7°

$r_1 = \infty$
$\quad d_1 = 0.2668 \quad n_1 = 1.51633 \quad \nu_1 = 64.15$
$r_2 = \infty$ (stop)
$\quad d_2 = 0.7691 \quad n_2 = 1.72916 \quad \nu_2 = 54.68$
$r_3 = -0.9924$
$\quad d_3 = 0.0334$
$r_4 = 3.2475$
$\quad d_4 = 0.3570 \quad n_3 = 1.88300 \quad \nu_3 = 40.76$
$r_5 = \infty$
$\quad d_5 = 0.2001$
$r_6 = \infty$
$\quad d_6 = 0.6671 \quad n_4 = 1.49400 \quad \nu_4 = 75.00$
$r_7 = \infty$
$\quad d_7 = 0.3638 \quad n_5 = 1.49700 \quad \nu_5 = 81.54$
$r_8 = \infty$
$D_{23}/f = 0.033, f_3/f = 3.678, r_{3F}/D_3 = 9.096$ Embodiment 3
f = 1.000, F/4.739, IH = 0.993,
object distance = 9.062, 2ω = 132.9°

$r_1 = \infty$
$\quad d_1 = 0.2416 \quad n_1 = 1.51633 \quad \nu_1 = 64.15$
$r_2 = \infty$
$\quad d_2 = 0.0181$
$r_3 = \infty$ (stop)
$\quad d_3 = 0.9666 \quad n_2 = 1.51400 \quad \nu_2 = 75.00$
$r_4 = -0.8271$
$\quad d_4 = 0.0604$
$r_5 = 2.2450$
$\quad d_5 = 0.6041 \quad n_3 = 1.88300 \quad \nu_3 = 40.76$
$r_6 = \infty$
$\quad d_6 = 0.1812$
$r_7 = \infty$
$\quad d_7 = 0.6041 \quad n_4 = 1.51633 \quad \nu_4 = 64.15$
$r_8 = \infty$
$\quad d_8 = 0.2655 \quad n_5 = 1.52287 \quad \nu_5 = 59.89$
$r_9 = \infty$
$D_{23}/f = 0.060, f_3/f = 2.543, r_{3F}/D_3 = 3.716$ Embodiment 4
f = 1.000, F/3.313, IH = 0.888,
object distance = 8.686, 2ω = 107.5°

$r_1 = \infty$
$\quad d_1 = 0.2316 \quad n_1 = 1.51633 \quad \nu_1 = 64.15$
$r_2 = \infty$ (Stop)
$\quad d_2 = 0.6944 \quad n_2 = 1.51400 \quad \nu_2 = 75.00$
$r_3 = -0.6949$
$\quad d_3 = 0.1452$
$r_4 = 1.7627$
$\quad d_4 = 0.5791 \quad n_3 = 1.51400 \quad \nu_3 = 75.00$
$r_5 = \infty$
$\quad d_5 = 0.9432 \quad n_4 = 1.49700 \quad \nu_4 = 81.54$
$r_6 = \infty$
$D_{23}/f = 0.145, f_3/f = 3.429, r_3/D_3 = 3.044$ Embodiment 5
f = 1.000, F/4.619, IH = 0.988,
object distance = 6.015, 2ω = 132.5°

$r_1 = \infty$
$\quad d_1 = 0.2406 \quad n_1 = 1.51633 \quad \nu_1 = 64.15$
$r_2 = \infty$ (stop)
$\quad d_2 = 1.0596 \quad n_2 = 1.88300 \quad \nu_2 = 40.76$
$r_3 = -1.3463$
$\quad d_3 = 0.0629$
$r_4 = 2.4601$
$\quad d_4 = 0.3765 \quad n_3 = 1.88300 \quad \nu_3 = 40.76$
$r_5 = \infty$
$\quad d_5 = 0.1203$
$r_6 = \infty$
$\quad d_6 = 0.9623 \quad n_4 = 1.51400 \quad \nu_4 = 75.00$
$r_7 = \infty$
$\quad d_7 = 0.2689 \quad n_5 = 1.52287 \quad \nu_5 = 59.89$
$r_8 = \infty$
$D_{23}/f = 0.063, f_3/f = 2.786, r_{3F}/D_3 = 6.535$ Embodiment 6
f = 1.000, F/3.823, IH = 0.957,
object distance = 10.463, 2ω = 133.3°

$r_1 = \infty$
$\quad d_1 = 0.3375 \quad n_1 = 1.51633 \quad \nu_1 = 64.15$
$r_2 = \infty$ (stop)
$\quad d_2 = 0.9695 \quad n_2 = 1.88300 \quad \nu_2 = 40.76$
$r_3 = -1.4018$
$\quad d_3 = 0.0773$
$r_4 = 2.2698$
$\quad d_4 = 0.4934 \quad n_3 = 1.88300 \quad \nu_3 = 40.76$
$r_5 = \infty$
$\quad d_5 = 0.8438 \quad n_4 = 1.49400 \quad \nu_4 = 75.00$
$r_6 = \infty$
$\quad d_6 = 0.3385 \quad n_5 = 1.52287 \quad \nu_5 = 59.89$
$R_7 = \infty$
$D_{23}/f = 0.077, f_3/f = 2.571, r_{3F}/D_3 = 4.601$ -continued Embodiment 7
f = 1.000, F/4.622, IH = 0.936,
object distance = 8.542, 2ω = 132.9°

| | | | |
|---|---|---|---|
| $r_1 = \infty$ | | | |
| | $d_1 = 0.3417$ | $n_1 = 1.51633$ | $\nu_1 = 64.15$ |
| $r_2 = \infty$ (stop) | | | |
| | $d_2 = 1.0146$ | $n_2 = 1.72916$ | $\nu_2 = 54.68$ |
| $r_3 = -1.2730$ | | | |
| | $d_3 = 0.0285$ | | |
| $r_4 = 2.0331$ | | | |
| | $d_4 = 0.4481$ | $n_3 = 1.88300$ | $\nu_3 = 40.76$ |
| $r_5 = \infty$ | | | |
| | $d_5 = 0.1139$ | | |
| $r_6 = \infty$ | | | |
| | $d_6 = 0.9111$ | $n_4 = 1.51400$ | $\nu_4 = 75.00$ |
| $r_7 = \infty$ | | | |
| | $d_7 = 0.2278$ | $n_5 = 1.52287$ | $\nu_5 = 59.89$ |
| $r_8 = \infty$ | | | |

$D_{23}/f = 0.028, f_3/f = 2.302, r_{3F}/D_3 = 4.537$

Embodiment 8
f = 1.000, F/3.876, IH = 0.804,
object distance = 13.652, 2ω = 114.0°

| | | | |
|---|---|---|---|
| $r_1 = \infty$ | | | |
| | $d_1 = 0.3034$ | $n_1 = 1.76820$ | $\nu_1 = 71.79$ |
| $r_2 = \infty$ | | | |
| | $d_2 = 0.0758$ | | |
| $r_3 = -1.0182$ (stop) | | | |
| | $d_3 = 0.0015$ | | |
| $r_4 = -1.0182$ | | | |
| | $d_4 = 0.6962$ | $n_2 = 1.88300$ | $\nu_2 = 40.78$ |
| $r_5 = -0.9859$ | | | |
| | $d_5 = 0.0758$ | | |
| $r_6 = 1.6728$ | | | |
| | $d_6 = 0.4968$ | $n_3 = 1.88300$ | $\nu_3 = 40.76$ |
| $r_7 = \infty$ | | | |
| | $d_7 = 0.0455$ | | |
| $r_8 = \infty$ | | | |
| | $d_8 = 0.6068$ | $n_4 = 1.51400$ | $\nu_4 = 75.00$ |
| $r_9 = \infty$ | | | |
| | $d_9 = 0.0455$ | | |
| $r_{10} = \infty$ | | | |
| | $d_{10} = 0.9331$ | $n_5 = 1.51633$ | $\nu_5 = 64.15$ |
| $r_{11} = \infty$ | | | |

$D_{23}/f = 0.076, f_3/f = 1.894, r_{3F}/D_3 = 3.367, f_3/f_2 = 0.6$

Embodiment 9
f = 1.000, F/3.994, IH = 1.014,
object distance = 11.089, 2ω = 133.1°

| | | | |
|---|---|---|---|
| $r_1 = \infty$ | | | |
| | $d_1 = 0.3577$ | $n_1 = 1.51633$ | $\nu_1 = 64.15$ |
| $r_2 = \infty$ | | | |
| | $d_2 = 0.0300$ | | |
| $r_3 = \infty$ | | | |
| | $d_3 = 0.5366$ | $n_2 = 1.51400$ | $\nu_2 = 75.00$ |
| $r_4 = \infty$ (stop) | | | |
| | $d_4 = 0.8943$ | $n_3 = 1.51400$ | $\nu_3 = 75.00$ |
| $r_5 = -0.7414$ | | | |
| | $d_5 = 0.0894$ | | |
| $r_6 = 1.6728$ | | | |
| | $d_6 = 0.4968$ | $n_3 = 1.88300$ | $\nu_3 = 40.76$ |
| $r_7 = \infty$ | | | |
| | $d_7 = 0.0455$ | | |
| $r_8 = \infty$ | | | |
| | $d_8 = 0.6068$ | $n_4 = 1.51400$ | $\nu_4 = 75.00$ |
| $r_9 = \infty$ | | | |
| | $d_9 = 0.0455$ | | |
| $r_{10} = \infty$ | | | |
| | $d_{10} = 0.9331$ | $n_5 = 1.51633$ | $\nu_5 = 64.15$ |
| $r_{11} = \infty$ | | | |

$D_{23}/f = 0.076, f_3/f = 1.894, r_{3F}/D_3 = 3.367, f_3/f_2 = 0.6$

Embodiment 9
f = 1.000, F/3.994, IH = 1.014,
object distance = 11.089, 2ω = 133.1°

| | | | |
|---|---|---|---|
| $r_1 = \infty$ | | | |
| | $d_1 = 0.3577$ | $n_1 = 1.51633$ | $\nu_1 = 64.15$ |

-continued

| | | | |
|---|---|---|---|
| $r_2 = \infty$ | | | |
| | $d_2 = 0.0300$ | | |
| $r_3 = \infty$ | | | |
| | $d_3 = 0.5366$ | $n_2 = 1.51400$ | $\nu_2 = 75.00$ |
| $r_4 = \infty$ (stop) | | | |
| | $d_4 = 0.8943$ | $n_3 = 1.51400$ | $\nu_3 = 75.00$ |
| $r_5 = -0.7414$ | | | |
| | $d_5 = 0.0894$ | | |
| $r_6 = 2.2296$ | | | |
| | $d_6 = 1.2965$ | $n_4 = 1.72916$ | $\nu_4 = 54.68$ |
| $r_7 = \infty$ | | | |
| | $d_7 = 0.4211$ | $n_5 = 1.52287$ | $\nu_5 = 59.89$ |
| $r_8 = \infty$ | | | |

$D_{23}/f = 0.089, f_3/f = 3.058, r_{3F}/D_3 = 1.720, h_1/h_2 = 1.44$

Embodiment 10
f = 1.000, F/4.393, IH = 0.984,
object distance = 8.986, 2ω = 140.0°

| | | | |
|---|---|---|---|
| $r_1 = \infty$ | | | |
| | $d_1 = 0.3595$ | $n_1 = 1.51633$ | $\nu_1 = 64.15$ |
| $r_2 = \infty$ (stop) | | | |
| | $d_2 = 0.9224$ | $n_2 = 1.77250$ | $\nu_2 = 49.60$ |
| $r_3 = -1.1929$ | | | |
| | $d_3 = 0.1498$ | | |
| $r_4 = 1.9795$ | | | |
| | $d_4 = 1.8019$ | $n_3 = 1.77250$ | $\nu_3 = 49.60$ |
| $r_5 = \infty$ | | | |

$D_{23}/f = 0.150, f_3/f = 2.562, r_{3F}/D_3 = 1.099$

Embodiment 11
f = 1.000, F/4.5421 IH = 1.034,
object distance = 9.436, 2ω = 133.1°

| | | | |
|---|---|---|---|
| $r_1 = \infty$ | | | |
| | $d_1 = 0.2516$ | $n_1 = 1.51633$ | $\nu_1 = 64.15$ |
| $r_2 = \infty$ (Stop) | | | |
| | $d_2 = 0.8965$ | $n_2 = 1.72916$ | $\nu_2 = 54.68$ |
| $r_3 = -0.9080$ | | | |
| | $d_3 = 0.2454$ | | |
| $r_4 = 2.0950$ | | | |
| | $d_4 = 1.0065$ | $n_3 = 1.51400$ | $\nu_3 = 75.00$ |
| $r_5 = \infty$ | | | |
| | $d_5 = 0.3762$ | $n_4 = 1.52287$ | $\nu_4 = 59.89$ |
| $r_6 = \infty$ | | | |

$D_{23}/f = 0.245, f_3/f = 4.076, r_{3F}/D_3 = 2.081$

Embodiment 12
f = 1.000, F/4.805, IH = 1.036,
object distance = 9.461, 2ω = 133.1°

| | | | |
|---|---|---|---|
| $r_1 = \infty$ | | | |
| | $d_1 = 0.2523$ | $n_1 = 1.51633$ | $\nu_1 = 64.15$ |
| $r_2 = \infty$ | | | |
| | $d_2 = 0.6307$ | $n_2 = 1.49400$ | $\nu_2 = 75.00$ |
| $r_3 = \infty$ (stop) | | | |
| | $d_3 = 0.9508$ | $n_3 = 1.72916$ | $\nu_3 = 54.68$ |
| $r_4 = -0.9681$ | | | |
| | $d_4 = 0.3663$ | | |
| $r_5 = 2.1392$ | | | |
| | $d_5 = 1.1432$ | $n_4 = 1.72916$ | $\nu_4 = 54.68$ |
| $r_6 = \infty$ | | | |
| | $d_6 = 0.2526$ | $n_5 = 1.52287$ | $\nu_5 = 59.89$ |
| $r_7 = \infty$ | | | |

$D_{23}/f = 0.366, f_3/f = 2.934, r_{3F}/D_3 = 1.871, h_1/h_2 = 1.33$

Embodiment 13
f = 1.000, F/7.0331, IH = 1.043,
object distance = 8.757, 2ω = 139.7°

| | | | |
|---|---|---|---|
| $r_1 = \infty$ | | | |
| | $d_1 = 0.4947$ | $n_1 = 1.78600$ | $\nu_1 = 45.00$ |
| $r_2 = \infty$ (stop) | | | |
| | $d_2 = 0.0080$ | | |
| $r_3 = \infty$ | | | |
| | $d_3 = 0.9663$ | $n_2 = 1.83900$ | $\nu_2 = 43.00$ |
| $r_4 = -1.0793$ | | | |
| | $d_4 = 0.2971$ | | |
| $r_5 = 1.7722$ | | | |
| | $d_5 = 0.8843$ | $n_3 = 1.51300$ | $\nu_3 = 70.00$ |

-continued

R₆ = ∞
                d₆ = 0.1996    n₄ = 1.60900    ν₄ = 60.00
r₇ = ∞
D₂₃/f = 0.297, f₃/f = 3.455, r₃F/D₃ = 2.004

Embodiment 14
f = 1.000, F/3.815, IH = 0.817,
object distance = 13.870, 2ω = 114.0° r₁ = ∞
                d₁ = 0.3082    n₁ = 1.76820    ν₁ = 71.79
r₂ = ∞
                d₂ = 0.0771
r₃ = −1.1131 (stop)
                d₃ = 0.0015
r₄ = −1.1131
                d₄ = 0.7062    n₂ = 1.88300    ν₂ = 40.78
r₅ = −0.8868
                d₅ = 0.0771
r₆ = 1.2909
                d₆ = 0.8524    n₃ = 1.51400    ν₃ = 75.00
r₇ = ∞
                d₇ = 0.0424
r₈ = ∞
                d₈ = 1.1021    n₄ = 1.51633    ν₄ = 64.15
r₉ = ∞
D₂₃/f = 0.077, f₃/f = 2.512, r₃F/D₃ = 1.514

Embodiment 15
f = 1.000, F/5.000, IH = 0.882,
object distance = 14.982, 2ω = 114.0° r₁ = ∞
                d₁ = 0.3329    n₁ = 1.76820    ν₁ = 71.79
r₂ = ∞ (stop)
                d₂ = 0.0500
r₃ = −1.3220
                d₃ = 0.7728    n₂ = 1.88300    ν₂ = 40.78
r₄ = −0.8387
                d₄ = 0.0832
r₅ = ∞
                d₅ = 0.8977    n₃ = 1.51400    ν₃ = 75.00
r₆ = −1.2889
                d₆ = 0.2000
r₇ = ∞
                d₇ = 1.0395    n₄ = 1.51633    ν₄ = 64.15
r₈ = ∞
D₂₃/f = 0.083, f₃/f = 2.508, r₃F/D₃ = ∞

Embodiment 16
f = 1.000, F/3.830, IH = 0.813,
object distance = 13.814, 2ω = 114.0° r₁ = ∞
                d₁ = 0.3070    n₁ = 1.76820    ν₁ = 71.79
r₂ = ∞
                d₂ = 0.1074
r₃ = −0.8597 (stop)
                d₃ = 0.0015
r₄ = −0.8597
                d₄ = 0.5457    n₂ = 1.88300    ν₂ = 40.78
r₅ = −0.8126
                d₅ = 0.1381
r₆ = 1.4708
                d₆ = 0.5542    n₃ = 1.72916    ν₃ = 54.68
r₇ = ∞
                d₇ = 0.0460
r₈ = ∞
                d₈ = 0.4605    n₄ = 1.51400    ν₄ = 75.00
r₉ = ∞
                d₉ = 0.2275
r₁₀ = ∞
                d₁₀ = 0.6139   n₅ = 1.51633    ν₅ = 64.15
r₁₁ = ∞
D₂₃/f = 0.138, f₃/f = 2.017, r₃F/D₃ = 2.654

Embodiment 17
f = 1.000, F/3.846, IH = 0.757,
object distance = 12.850, 2ω = 100.0° r₁ = ∞
                d₁ = 0.2856    n₁ = 1.76820    ν₁ = 71.79

-continued r₂ = ∞
                d₂ = 0.0714
r₃ = −1.1205 (stop)
                d₃ = 0.0014
r₄ = −1.1205
                d₄ = 0.6819    n₂ = 1.51400    ν₂ = 75.00
r₅ = −0.6343
                d₅ = 9.0714
r₆ = 1.2501
                d₆ = 0.7680    n₃ = 1.51400    ν₃ = 75.00
r₇ = ∞
                d₇ = 0.0680
r₈ = ∞
                d₈ = 1.0210    n₄ = 1.51633    ν₄ = 64.15
r₉ = ∞
D₂₃/f = 0.071, f₃/f = 2.432, r₃F/D₃ = 1.628

Embodiment 18
f = 1.000, F/3.840, IH = 0.847,
object distance = 10.165, 2ω = 113.0° r₁ = ∞
                d₁ = 0.3388    n₁ = 1.51633    ν₁ = 64.15
r₂ = 1.3128
                d₂ = 0.1762
r₃ = ∞ (stop)
                d₃ = 1.0807    n₂ = 1.88300    ν₂ = 40.78
r₄ = −1.0778
                d₄ = 0.0957
r₅ = 3.2709
                d₅ = 0.6702    n₃ = 1.88300    ν₃ = 40.78
r₆ = ∞
                d₆ = 0.0508
r₇ = ∞
                d₇ = 0.6777    n₄ = 1.51400    ν₄ = 75.00
r₈ = ∞
                d₈ = 0.7198    n₅ = 1.51633    ν₅ = 64.15
r₉ = ∞
D₂₃/f = 0.096, f₃/f = 3.704, r₃F/D₃ = 4.880

Embodiment 19
f = 1.000, F/3.868, IH = 0.782,
object distance = 13.273, 2ω = 113.3° r₁ = ∞
                d₁ = 0.2950    n₁ = 1.76820    ν₁ = 71.79
r₂ = ∞
                d₂ = 0.1032
r₃ = −1.7041
                d₃ = 0.4235    n₂ = 1.88300    ν₂ = 40.78
r₄ = ∞
                d₄ = 0.0442
r₅ = ∞ (Stop)
                d₅ = 0.6362    n₃ = 1.72916    ν₃ = 54.68
r₆ = −1.1005
                d₆ = 0.0737
r₇ = 1.8071
                d₇ = 0.4135    n₄ = 1.88300    ν₄ = 40.78
r₈ = ∞
                d₈ = 0.0442
r₉ = ∞
                d₉ = 0.5899    n₅ = 1.51400    ν₅ = 75.00
r₁₀ = ∞
                d₁₀ = 0.0442
r₁₁ = ∞
                d₁₁ = 1.0324   n₆ = 1.51633    ν₆ = 64.15
r₁₂ = ∞
D₂₃/f = 0.074, f₃/f = 2.047, r₃F/D₃ = 4.370

Embodiment 20
f = 1.090, F/3.920, IH = 0.773,
object distance = 13.118, 2ω = 112.9° r₁ = ∞
                d₁ = 0.2915    n₁ = 1.76820    ν₁ = 71.79
r₂ = ∞
                d₂ = 0.1020
r₃ = −1.9878
                d₃ = 0.5186    n₂ = 1.88300    ν₂ = 40.78
r₄ = ∞
                d₄ = 0.0437

-continued $r_5 = \infty$ (stop)

| | | | |
|---|---|---|---|
| | $d_5 = 0.6618$ | $n_3 = 1.51400$ | $\nu_3 = 75.00$ |
| $r_6 = -0.8693$ | | | |
| | $d_6 = 0.0729$ | | |
| $r_7 = 1.7690$ | | | |
| | $d_7 = 0.6301$ | $n_4 = 1.88300$ | $\nu_4 = 40.78$ |
| $r_9 = \infty$ | | | |
| | $d_8 = 0.3037$ | | |
| $r_9 = \infty$ | | | |
| | $d_9 = 1.1342$ | $n_5 = 1.51633$ | $\nu_5 = 64.15$ |
| $r_{10} = \infty$ | | | |

$D_{23}/f = 0.073$, $f_3/f = 2.003$, $r_{3F}/D_3 = 2.807$

Embodiment 21
$f = 1.000$, $F/3.896$, $IH = 0.847$,
object distance = 14.387, $2\omega = 112.8°$

| | | | |
|---|---|---|---|
| $r_1 = \infty$ | | | |
| | $d_1 = 0.3996$ | $n_1 = 1.88300$ | $\nu_1 = 40.78$ |
| $r_2 = 1.1168$ | | | |
| | $d_2 = 0.0959$ | | |
| $r_3 = \infty$ (stop) | | | |
| | $d_3 = 0.7541$ | $n_2 = 1.88300$ | $\nu_2 = 40.78$ |
| $r_4 = -0.8091$ | | | |
| | $d_4 = 0.0799$ | | |
| $r_5 = \infty$ | | | |
| | $d_5 = 0.9037$ | $n_3 = 1.51400$ | $\nu_3 = 75.00$ |
| $r_6 = -1.7050$ | | | |
| | $d_6 = 0.1987$ | | |
| $r_7 = \infty$ | | | |
| | $d_7 = 1.1675$ | $n_4 = 1.51633$ | $\nu_4 = 64.15$ |
| $r_8 = \infty$ | | | |

$D_{23}/f = 0.080$, $f_3/f = 3.317$

Embodiment 22
$f = 1.000$, $F/3.808$, $IH = 0.817$,
object distance = 13.866, $2\omega = 114.4°$

| | | | |
|---|---|---|---|
| $r_1 = \infty$ | | | |
| | $d_1 = 0.3081$ | $n_1 = 1.76820$ | $\nu_1 = 71.79$ |
| $r_2 = \infty$ | | | |
| | $d_2 = 0.1078$ | | |
| $r_3 = -1.6545$ | | | |
| | $d_3 = 0.4361$ | $n_2 = 1.88300$ | $\nu_2 = 40.78$ |
| $r_4 = \infty$ | | | |
| | $d_4 = 0.0462$ | | |
| $r_5 = \infty$ (stop) | | | |
| | $d_5 = 0.6072$ | $n_3 = 1.88300$ | $\nu_3 = 40.78$ |
| $r_6 = -1.0751$ | | | |
| | $d_6 = 0.0770$ | | |
| $r_7 = \infty$ | | | |
| | $d_7 = 0.8216$ | $n_4 = 1.51400$ | $\nu_4 = 75.00$ |
| $r_8 = -1.1202$ | | | |
| | $d_8 = 0.3081$ | | |
| $r_9 = \infty$ | | | |
| | $d_9 = 1.1252$ | $n_5 = 1.51633$ | $\nu_5 = 64.15$ |
| $r_{10} = \infty$ | | | |

$D_{23}/f = 0.077$, $f_3/f = 2.179$ wherein the reference symbols $r_1, r_2, \ldots$ represent radii of curvature on surfaces of respective lens components, the reference symbols $d_1, d_2, \ldots$ designate thicknesses of the respective lens components and airspaces reserved therebetween, the reference symbols $n_1, n_2, \ldots$ denote refractive indices of the respective lens components, and the reference symbols $\nu_1, \nu_2, \ldots$ represent Abbe's numbers of the respective lens components.

The first embodiment has a composition illustrated in FIG. 1, wherein the objective lens system comprises, in order from the object side, a first lens component $L_1$ which is a cover glass plate, a second lens component $L_2$, a third lens component $L_3$, an infrared absorption filter F and a CCD cover glass plate C. Furthermore, an aperture stop S is disposed on the image side of the first lens component $L_1$. The aperture stop is formed, for example, by depositing a metal such as chromium, printing a black paint or bonding a thin metal sheet. Furthermore, the first lens component $L_1$ and the second lens component $L_2$ are cemented to each other.

The second lens component $L_2$ and the third lens component $L_3$ have the same diameter and are fixed to a lens barrel 1. Furthermore, the infrared absorption filter F is cemented to the CCD cover glass plate C, and the filter F and the cover glass plate C are fixed to the CCD frame 2. The objective lens system is configured to adjust its focus condition by moving the lens barrel 1 and the CCD frame 2 relative to each other. In other words, the objective lens system adjusts its focus condition by varying an airspace reserved between the third lens component $L_3$ and the filter F.

The first embodiment is configured to allow the principal ray to emerge at a large inclination angle and uses the third lens component which has an outside diameter on the order of the image height or smaller, thereby being capable of adjusting the focus condition by moving the lens barrel 1 and the CCD frame 2 relative to each other. Furthermore, a fitting length is long between the lens barrel 1 and the CCD frame 2 thereby reducing rattling in this composition.

The first embodiment satisfies the conditions (1), (2), (3) and (5).

Aberration conditions of the first embodiment are illustrated in FIG. 23.

Figure 2:
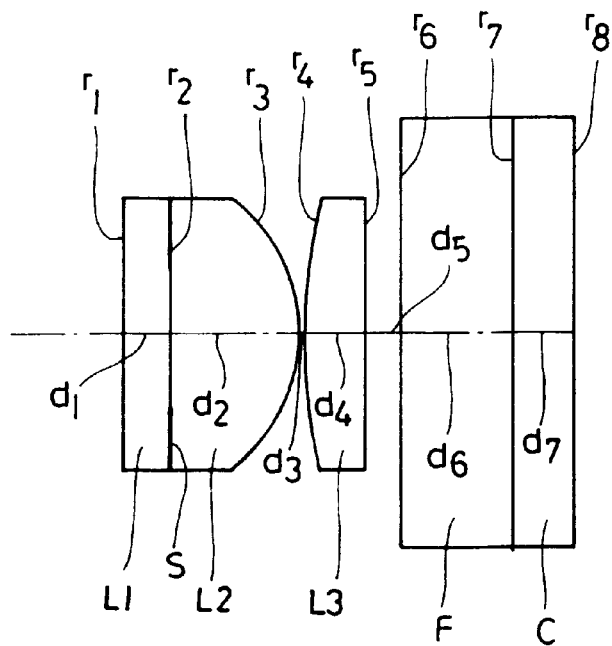
FIG. 2 is a sectional view illustrating a composition of a second embodiment of the objective lens system for endoscopes according to the present invention.

The second embodiment has a composition illustrated in FIG. 2, and comprises like the first embodiment, in order from the object side, a first lens component $L_1$ which is a cover glass plate, a second lens component $L_2$, a third lens component $L_3$, an infrared absorption filter F and a CCD cover glass plate C, an aperture stop S being disposed on an image side surface of the first lens component $L_1$. A lens system for endoscopes preferred as the second embodiment satisfies the conditions (1), (2), (3) and (5).

The lens system preferred as the second embodiment is attached to a lens barrel like the first embodiment as shown FIG. 1. Furthermore, a focus condition of the second embodiment is adjustable with the lens barrel and a CCD frame.

Figure 3:
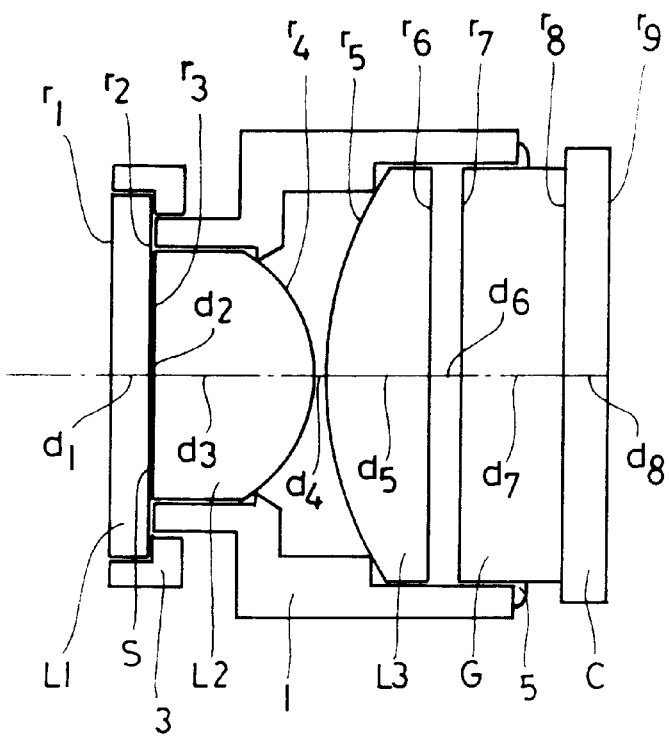
FIG. 3 is a sectional view illustrating a composition of the third embodiment of the objective lens system for endoscopes according to the present invention.

The third embodiment has a composition shown in FIG. 3, wherein a lens system comprises, in order from the object side, a first lens component $L_1$ which is a cover glass plate, a second lens component $L_2$, a third lens component $L_3$, a CCD fixing glass plate G and a CCD cover glass plate C. Furthermore, an aperture stop S is disposed on an object side surface of the second lens component $L_2$.

The objective lens system for endoscopes preferred as the third embodiment satisfies the conditions (1), (2), (3) and (5).

In the lens system preferred as the third embodiment, the second lens component $L_2$ and the third lens component $L_3$ are fixed to a lens barrel 1. Furthermore, the CCD fixing glass plate G is cemented to the CCD cover glass plate C and these members are also inserted into the lens barrel 1. A focus condition of the lens system is adjustable by moving the CCD fixing glass plate G in both directions inside the lens barrel 1 and the CCD fixing glass plate G is fixed after adjustment with an bonding agent 5.

The CCD cover glass plate C is not circular but has in most cases a rectangular shape which is matched with a shape of an image pickup area of a CCD. Accordingly, the CCD cover glass plate C can be assembled easily by preliminarily cementing the CCD fixing glass plate G which is circular shape to the CCD cover glass plate C in a condition centered with the image pickup area and fixing the CCD fixed glass plate G to the lens barrel 1.

The lens system preferred as the first embodiment uses the infrared absorption filter F which serves also as the CCD fixing glass plate. Since the infrared absorption filter is made of a glass material softer than an ordinary glass material and can easily be scratched on its surface, however, it is not preferable to dispose the infrared absorption filter at a location near an image surface at which a light bundle is thin and an image of a scratch is allowed to be formed on an image of an object.

The lens system preferred as the third embodiment uses a glass material forming the infrared absorption filter on a lens component disposed in the vicinity of the stop on which a light bundle is relatively thick and an image is not affected even when the lens component is scratched.

In the third embodiment, the first lens component $L_1$ is fixed to a frame 3 which is attachable and detachable to and from the lens barrel 1.

Generally speaking, a surface of an endoscope tip is a portion which is most apt to be broken since it is often brought into contact or collision with exteriors at a stage where it is inserted.

In the third embodiment, the first lens component $L_1$ which is apt to be broken is structured separately from the lens barrel so that the first lens component $L_1$ can be replaced easily. Though an ordinary anti-reflection coating may be disposed on an image side surface of the first lens component $L_1$, the image side surface may be coated with a film which reflects a semiconductor laser or YAG laser which is used for laser treatment. Furthermore, several kinds of cover glass plates may be prepared so that the cover glass plates are exchanged with one another in accordance with lasers having different wavelengths.

For enhancing an effect to prevent breakage, it is preferable to compose the cover glass plate of a hard glass material such as sapphire.

In eighth, fourteenth, fifteenth, sixteenth, seventeenth, nineteenth, twentieth and twenty second embodiments described later, first lens components $L_1$ are composed of sapphire. The effect to prevent breakage can be obtained by using sapphire for an optical member disposed on the object side (the first lens component $L_1$).

Figure 4:
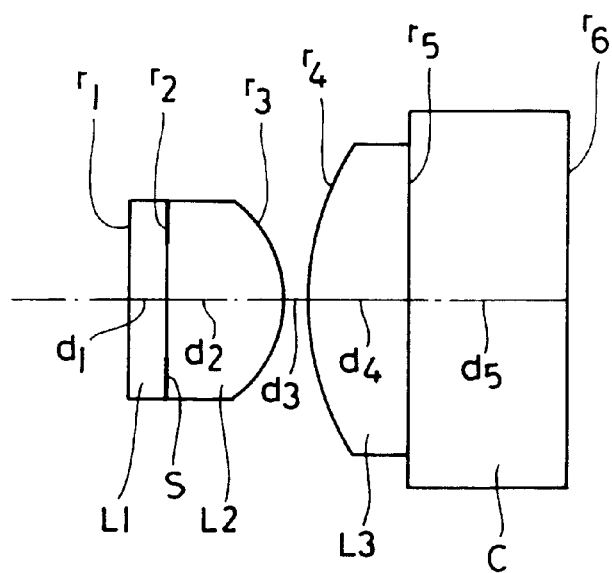
FIG. 4 is a sectional view illustrating a composition of a fourth embodiment of the objective lens system for endoscopes according to the present invention.

The fourth embodiment has a composition illustrated in FIG. 4, wherein a lens system comprises, in order from the object side, a first lens component $L_1$ which is a cover glass plate, a second lens component $L_2$, a third lens component $L_3$ and a CCD cover glass plate C. The lens system preferred as the fourth embodiment satisfies the conditions (1), (2), (3) and (5). In the fourth embodiment, the first lens component $L_1$ is cemented to the second lens component $L_2$ and the third lens component $L_3$ is cemented to the CCD cover glass plate C. Furthermore, the second lens component $L_2$ and the third lens component $L_3$ are made of a material of an infrared absorption filter.

Figure 5:
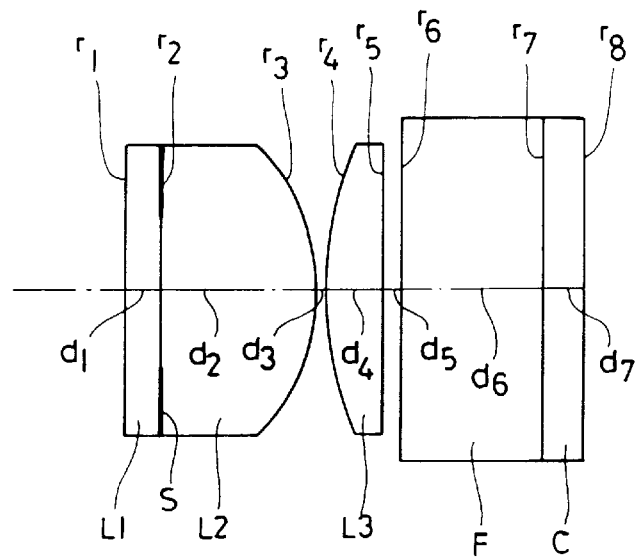
FIG. 5 is a sectional view illustrating a composition of a fifth embodiment of the objective lens system for endoscopes according to the present invention.

The fifth embodiment comprises, in order from the object side as shown in FIG. 5, a first lens component $L_1$ which is a cover glass plate, a second lens component $L_2$, a third lens component $L_3$, an infrared absorption filter F and a CCD cover glass plate C.

A lens system preferred as the fifth embodiment satisfies the conditions (1), (2) and (3).

In the fifth embodiment, the first lens component $L_1$ is cemented to the second lens component $L_2$ and the infrared absorption filter F is cemented to the CCD cover glass plate C.

Figure 6:
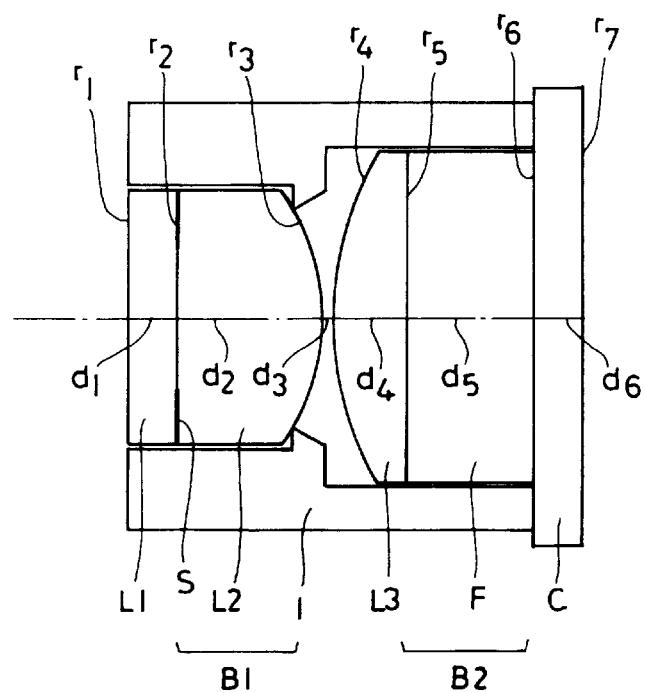
FIG. 6 is a sectional view illustrating a composition of a sixth embodiment of the objective lens system for endoscopes according to the present invention.

The sixth embodiment is a lens system which has a composition illustrated in FIG. 6, or comprises, in order from the object side, a first lens component $L_1$ which is a cover glass plate, a second lens component $L_2$, a third lens component $L_3$, an infrared absorption filter F and a CCD cover glass plate C, and satisfies the conditions (1), (2) and (3). Furthermore, the sixth embodiment consists of a first assembly $B_1$ and a second assembly $B_2$: the first assembly $B_1$ which is composed by cementing the first lens component $L_1$ to the second lens component $L_2$, whereas the second assembly $B_2$ is composed by cementing the infrared absorption filter F having an circular outer circumferential shape to the CCD cover glass plate C so that the infrared absorption filter F is centered with an image pickup area of the CCD cover glass plate C.

Furthermore, the infrared absorption filter F having the circular outer circumferential shape has an outside diameter which is the same as that of the third lens component $L_3$, and the third lens component $L_3$ is also set in a condition centered with the image pickup area by cementing the filter F of the assembly of the infrared absorption filter F and the CCD cover glass plate C to the third lens component $L_3$ which outer circumferences matched with each other.

In each of the embodiments of the present invention, a CCD main body is located on the image side of the CCD cover glass plate.

In the sixth embodiment, the first assembly $B_1$ is disposed in a lens barrel 1 so that an image side surface of the second lens component $L_2$ is sustained and the second assembly $B_2$ is disposed in the lens barrel 1 so that an object side surface of the CCD cover glass plate C is sustained. Accordingly, errors in thicknesses of the third lens component $L_3$ and the infrared absorption filter F can be cancelled with an airspace reserved between the second lens component $L_2$ and the third lens component $L_3$.

An error in focus point are attributed to errors in radii of curvature on surfaces and errors in airspaces, among which errors in airspaces after the third lens component are directly associated with the error in the focus point and constitute a great causes.

The sixth embodiment which has the composition described above limits the a main cause for the error in the focus point only to an error in a thickness of the CCD cover glass plate C and poses no problem for practical use even with no focus point adjustment. As a result, the sixth embodiment allows a space for focus point adjustment to be used as a space for disposing the infrared absorption filter, thereby omitting a procedure for adjustment at an assembly stage.

Figure 7:
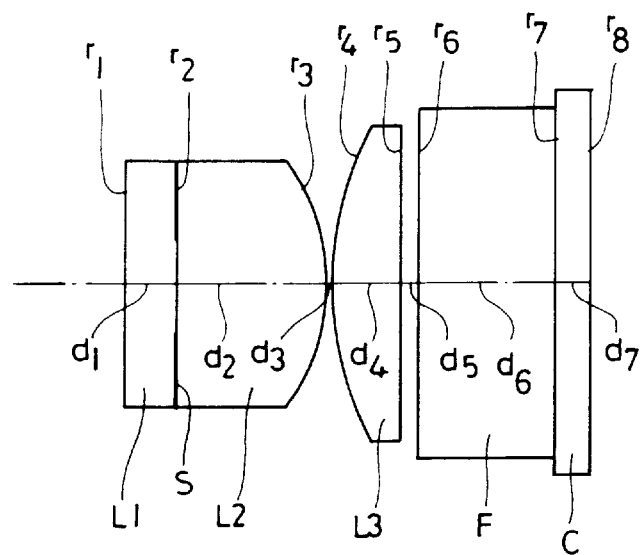
FIG. 7 is a sectional view illustrating a composition of a seventh embodiment of the objective lens system for endoscopes according to the present invention.

The seventh embodiment has a composition which is illustrated in FIG. 7 and similar to that of the fifth embodiment. Speaking concretely, the seventh embodiment comprises, in order from the object side, a first lens component $L_1$ which is a cover glass plate, a second lens component $L_2$, a third lens component $L_3$, an infrared absorption filter F and a CCD cover glass plate C: the first lens component $L_1$ being cemented to the second lens component $L_2$ and the filter F being cemented to the CCD cover glass plate C.

The lens system preferred as the seventh embodiment satisfies the conditions (1), (2) and (5).

Figure 8:
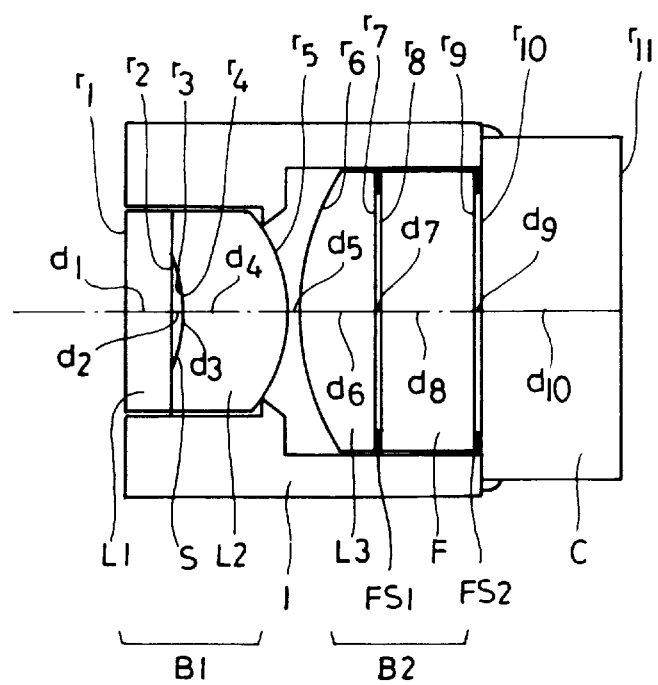
FIG. 8 is a sectional view illustrating a composition of an eighth embodiment of the objective lens system for endoscopes according to the present invention.

The eighth embodiment which has a composition similar to that of the sixth embodiment comprises, in order from the object side as shown in FIG. 8, a first lens component $L_1$ which is a cover glass plate, a second lens component $L_2$, a third lens component $L_3$, an infrared absorption filter F and a CCD cover glass plate C: an aperture stop S being disposed on the concave object side surface of the second lens component $L_2$. The eighth embodiment satisfies the conditions (1), (2) and (4).

Like the sixth embodiment described above, the eighth embodiment has a configuration wherein a first assembly $B_1$ and a second assembly $B_2$ are fixed to a lens barrel 1, whereby the eighth embodiment requires no focus adjustment. The eighth embodiment uses a concave surface as an object side surface of the second lens component $L_2$ and is configured to reserve a long back focal length by satisfying the condition (4). Furthermore, the eighth embodiment which adopts the aperture stop S to the concave object side surface of the second lens component $L_2$ allows coma to be corrected easier than a lens system wherein an aperture stop S is disposed on the first lens component $L_1$. Since erroneous working on a planar surface of the second lens component $L_2$ does not cause an error in a location of the aperture stop, the eighth embodiment allows an image to be degraded in a marginal portion in particular.

Furthermore, thin metal flare stops $FS_1$ and $FS_2$ are disposed between the third lens component $L_3$ and the infrared absorption filter F and between the infrared absorption filter F and the CCD cover glass plate C respectively in the second assembly $B_2$ of the eighth embodiment so that detrimental rays are cut by these flare stops $FS_1$ and $FS_2$. Furthermore, laser ray cutting coats are formed on an image side surface of the third lens component $L_3$ and surfaces of the infrared absorption filter F and the CCD cover glass plate C to cut flare produced from a laser light for laser treatment. Furthermore, it is possible to cut the laser rays sufficiently by disposing two coats of the same kind on both sides of the infrared absorption filter F, thereby absorbing multiplex reflection rays with the infrared absorption filter F.

The lens system disclosed by U.S. Pat. No. 4,858,002 mentioned above as the conventional example does not use a cover glass plate and an object side surface of a first lens component in this conventional example is configured as a concave surface to which foreign matters are apt to adhere. When foreign matters adhere to a lens surface, images of the foreign matters are formed on an image surface undesirably for observation. It is therefore preferable to disposed a first lens component which is a cover glass plate on the object side as in the eighth embodiment. This cover glass plate can be configured as a separate member as in the third embodiment.

Figure 9:
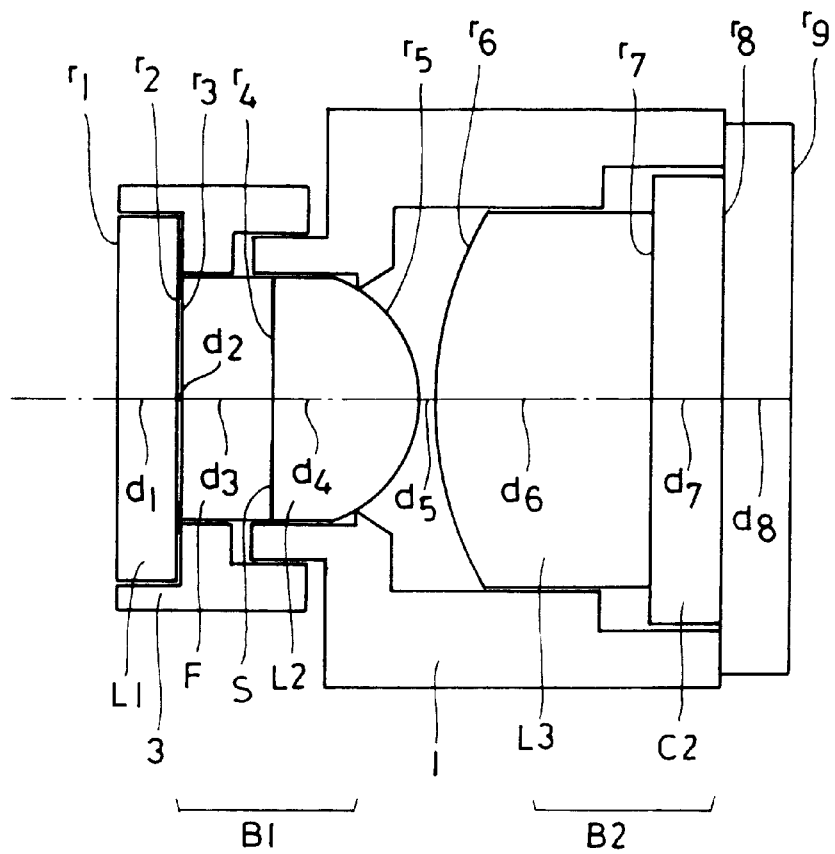
FIG. 9 is a sectional view illustrating a composition of a ninth embodiment of the objective lens system for endoscopes according to the present invention.

The ninth embodiment comprises, in order from the object side as shown in FIG. 9, a first lens component $L_1$ which is a cover glass plate, an infrared absorption filter F, a second lens component $L_2$, a third lens component $L_3$ and a CCD cover glass plate C. A lens system preferred as the ninth embodiment satisfies the conditions (2), (3) and (5).

The ninth embodiment is composed of a first assembly $B_1$ and a second assembly $B_2$: the first assembly $B_1$ consisting of an aperture stop S and the second lens component $L_2$; and the second assembly $B_2$ has a composition wherein the circular third lens component $L_3$ is centered with an image pickup area and cemented to the CCD cover glass plate C. Furthermore, the second lens component $L_2$ is made of a material which is used to compose an infrared absorption filter.

Furthermore, the first assembly $B_1$ is disposed in a lens barrel so that an image side surface of the second lens component $L_2$ is sustained and the second assembly $B_2$ is disposed in the lens barrel 1 so that only a surface corresponding to a location of an image pickup surface of a CCD main body is sustained. Accordingly, errors in thicknesses of the third lens component $L_3$ and the CCD cover glass plate C can be cancelled with an airspace reserved between the second lens component $L_2$ and the third lens component $L_3$.

The ninth embodiment has nearly no cause for an error of a focus point and requires no focus adjustment.

In the ninth embodiment, the first lens component $L_1$, a flare stop FS and the infrared absorption filter F are assembled in a frame 3 which is attachable and detachable to and from the lens barrel 1. Furthermore, the infrared absorption filter F is disposed on the object side of the aperture stop S so that the infrared absorption filter can be exchanged with an infrared absorption filter which has a different thickness or is of a different kind by detaching and attaching the frame 3.

Since the frame 3 is configured so as to be attachable and detachable and various kinds of cover glass filters equipped with different filters are used in exchange dependently on various light sources having different spectral characteristics, the ninth embodiment is capable of always maintaining an optimum color reproducibility and cutting without fail laser rays which are different in spectral characteristics and output levels.

In the ninth embodiment wherein the infrared absorption filter F is disposed before the aperture stop S, rays are high on a first surface, whereby the first lens component $L_1$ has a large outside diameter. To prevent the first lens component $L_1$ from having a large outside diameter, it is preferable to satisfy the following condition (7):

$$|h_1/h_2|<1.5 \tag{7}$$

wherein the reference symbol $h_1$ represents a height of a principal ray on an object side surface of the first lens component $L_1$ and the reference symbol $h_2$ designates a height of the principal ray on the image side surface of the second lens component $L_2$.

If the upper limit of 1.5 of the condition (7) is exceeded, the first lens component will have a remarkably large outside diameter, thereby undesirably enlarging an outside diameter of an endoscope tip.

Figure 10:
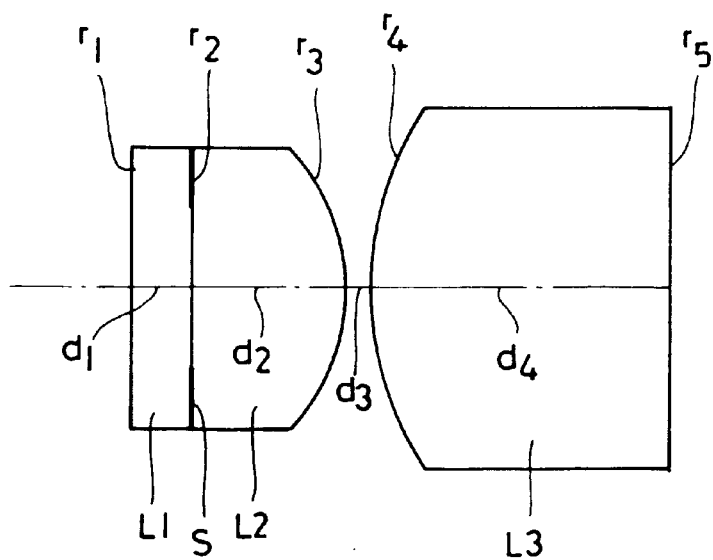
FIG. 10 is a sectional view illustrating a composition of a tenth embodiment of the objective lens system for endoscopes according to the present invention.

The tenth embodiment has a composition illustrated in FIG. 10, wherein a lens system comprises, in order from the object side, a first lens component $L_1$ which is a cover glass plate, a stop S, a second lens component $L_2$ and a third lens component $L_3$: the first lens component $L_1$ being cemented to the second lens component $L_2$.

The lens system preferred as the tenth embodiment satisfies the conditions (5), (2) and (3).

Figure 11:
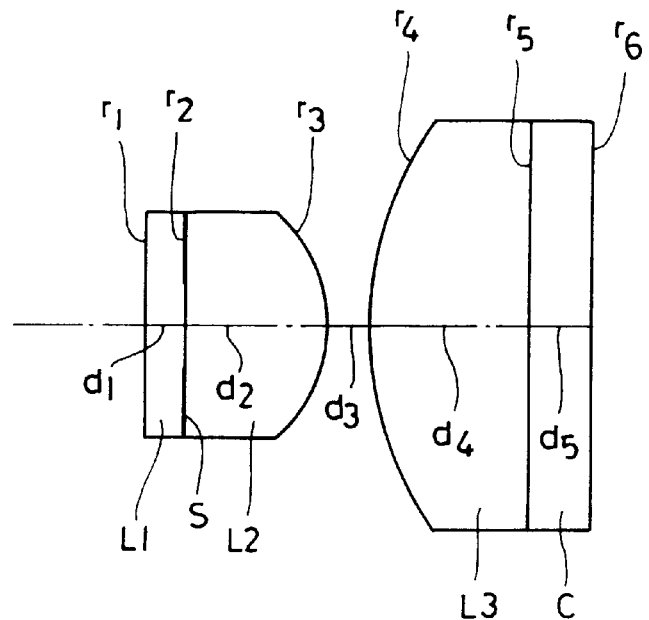
FIG. 11 is a sectional view illustrating a composition of an eleventh embodiment of the objective lens system for endoscopes according to the present invention.

The eleventh embodiment has a composition illustrated in FIG. 11, wherein a lens system comprises, in order from the object side, a first lens component $L_1$ which is a cover glass plate, a stop S, a second lens component $L_2$, a third lens component $L_3$ and a CCD cover glass plate C. The first lens component $L_1$ is cemented to the second lens component $L_2$ and the third lens component $L_3$ is cemented to the CCD cover glass plate C. Furthermore, the third lens component $L_3$ is made of a material which is used for an infrared absorption filter.

The eleventh embodiment satisfies the conditions (5) and (3).

Figure 12:
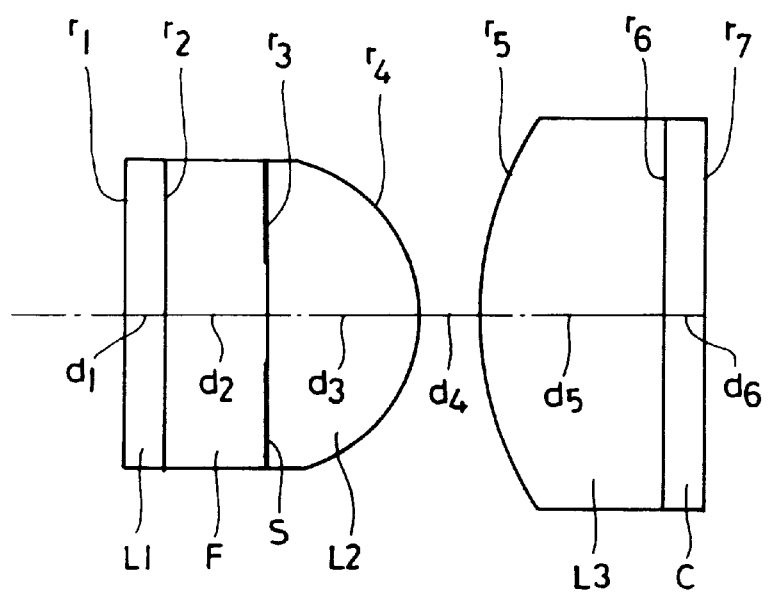
FIG. 12 is a sectional view illustrating a composition of a twelfth embodiment of the objective lens system for endoscopes according to the present invention.

The twelfth embodiment has a composition illustrated in FIG. 12, or comprises, in order from the object side, a first lens component $L_1$ which is a cover glass plate, an infrared absorption filter F, a stop S, a second lens component $L_2$, a third lens component $L_3$ and a CCD cover glass plate C. The first lens component $L_1$, the infrared absorption filter F and the second lens component $L_2$ are cemented to one another, and the third lens component $L_3$ is cemented to the CCD cover glass plate C. In the twelfth embodiment, an aperture stop S is disposed between the infrared absorption filter F and the second lens component $L_2$. Since the infrared absorption filter is disposed in the vicinity of the stop, or on the object side of the second lens component $L_2$, at which a light bundle is relatively thick as in the third embodiment, the twelfth embodiment is capable of preventing an image from being affected by dust or a scratch on the filter.

The twelfth embodiment satisfies the conditions (5) and (3).

Figure 13:
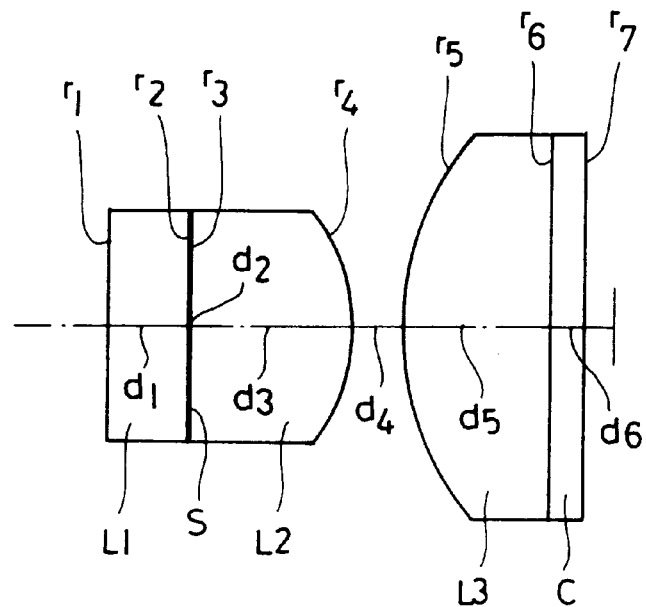
FIG. 13 is a sectional view illustrating a composition of a thirteenth embodiment of the objective lens system for endoscopes according to the present invention.

The thirteenth embodiment comprises, in order from the object side as shown in FIG. 13, a first lens component $L_1$ which is a cover glass plate, a second lens component $L_2$, a third lens component $L_3$ and a CCD cover glass plate C: the first lens component $L_1$ being cemented to the second lens component $L_2$, the third lens component $L_3$ being cemented to the CCD cover glass plate C, and an aperture stop S being disposed between the first lens component $L_1$ and the second lens component $L_2$.

A lens system preferred as the thirteenth embodiment satisfies the conditions (5) and (3).

Figure 14:
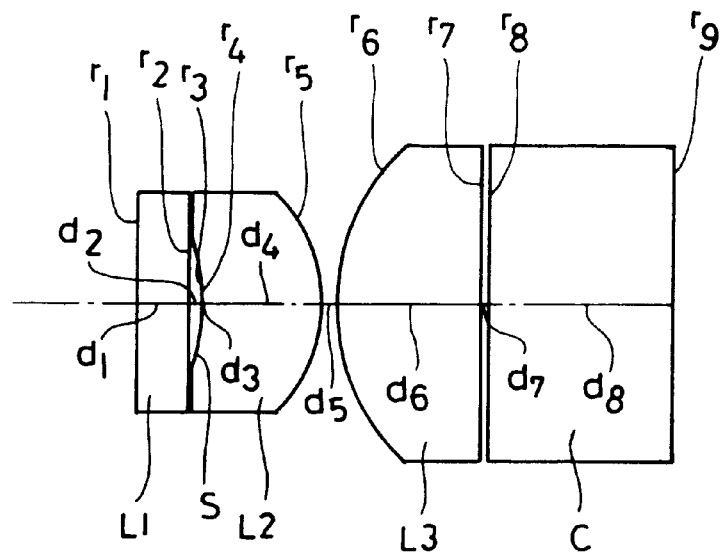
FIG. 14 is a sectional view illustrating a composition of a fourteenth embodiment of the objective lens system for endoscopes according to the present invention.

The fourteenth embodiment comprises, in order from the object side as shown in FIG. 14, a first lens component $L_1$ which is a cover glass plate, a second lens component $L_2$, a third lens component $L_3$ and a CCD cover glass plate C. A lens system preferred as the fourteenth embodiment satisfies the conditions (6), (2) and (3). Furthermore, the third lens component $L_3$ is made of a material which is used for an infrared absorption filter. An aperture stop S is formed on a concave object side surface of the second lens component $L_2$ by means of metal deposition or the like.

In the fourteenth embodiment, a material which has a large Abbe's number and is used for an infrared absorption filter selected for the third lens component $L_3$ which is effective to correct lateral chromatic aberration, whereby the fourteenth embodiment is capable of suppressing lateral chromatic aberration at a low level. Since a glass material which has such a large Abbe's number ordinarily has a low refractive index, the third lens component $L_3$ has a low refractive index and a small marginal thickness in particular, thereby being hardly worked. To solve this problem, the fifteenth embodiment is configured to satisfy the conditions (2) and (3), thereby having an enhanced workability.

Figure 15:
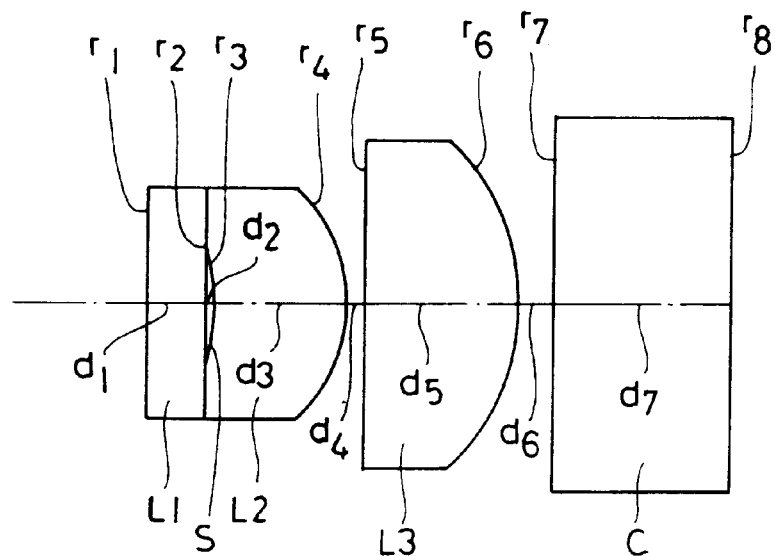
FIG. 15 is a sectional view illustrating a composition of a fifteenth embodiment of the objective lens system for endoscopes according to the present invention.

The fifteenth embodiment is a lens system which comprises, in order from the object side as shown in FIG. 15, a first lens component $L_1$ which is a cover glass plate, a second lens component $L_2$, a third lens component $L_3$ and a CCD cover glass plate C, and satisfies the conditions (6), (2) and (3).

In the fifteenth embodiment, an infrared absorption filter is configured as the third lens component $L_3$. The third lens component L3 has a planar object side surface on which a laser cut coat is formed. Accordingly, the fifteenth embodiment is capable of preventing flare by absorbing multiple reflection light between this coat and an image pickup surface with the infrared absorption filter.

Figure 16:
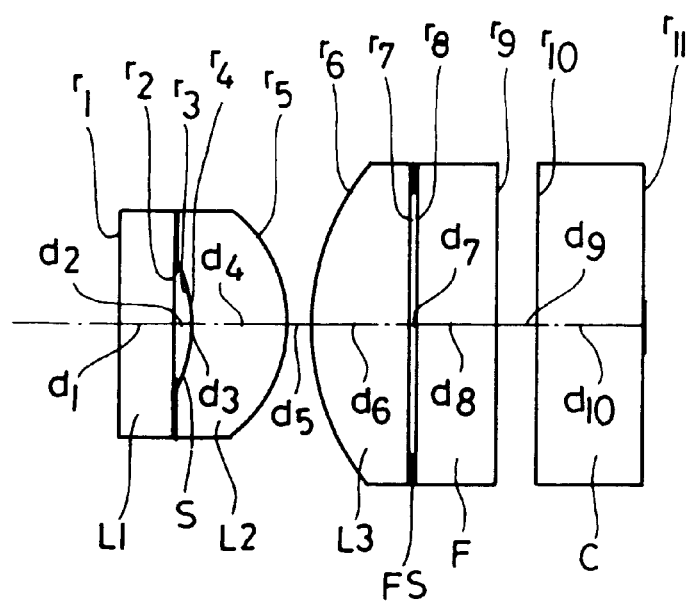
FIG. 16 is a sectional view illustrating a composition of a sixteenth embodiment of the objective lens system for endoscopes according to the present invention.

The sixteenth embodiment has a composition illustrated in FIG. 16, wherein a lens system comprises, in order from the object side, a first lens component $L_1$ which is a cover glass plate, a second lens component $L_2$, a third lens component $L_3$, an infrared absorption filter F and a CCD cover glass plate C. An aperture stop is disposed on a concave surface which is an object side surface of the second lens component $L_2$, and a flare stop FS is disposed between an image side surface of the third lens component $L_3$ and an object side surface of the infrared absorption filter F.

The lens system preferred as the sixteenth embodiment satisfies the conditions (6) and (2).

Figure 17:
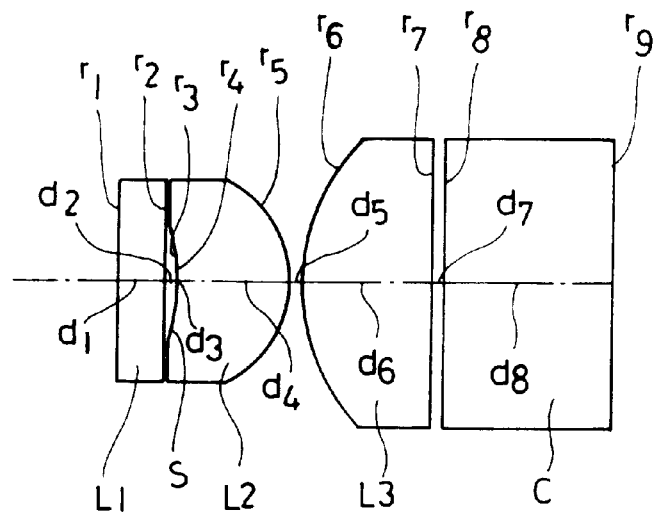
FIG. 17 is a sectional view illustrating a composition of a seventeenth embodiment of the objective lens system for endoscopes according to the present invention.

The seventeenth embodiment has a composition illustrated in FIG. 17, wherein a lens system comprises, in order from the object side, a first lens component $L_1$ which is a cover glass plate, a second lens component $L_2$, a third lens component $L_3$ and a CCD cover glass plate C. Furthermore, an aperture stop S is disposed on a concave object side surface of the second lens component $L_2$ as in the sixteenth embodiment. Furthermore, the third lens component $L_3$ is made of a material for an infrared absorption filter to omit the infrared absorption filter which is used in the sixteenth embodiment.

The lens system preferred as the seventeenth embodiment also satisfies the conditions (6) and (3).

The eighteenth embodiment is a lens system which has a composition illustrated in FIG. 18 and comprises, in order from the object side, a first negative lens component $L_1$, a second positive lens component $L_2$, a third positive lens component $L_3$, an infrared absorption filter F and a CCD cover glass plate C. Furthermore, an aperture stop S is disposed between the first lens component $L_1$ and the second lens component $L_2$, and a flare stop FS is disposed between the third lens component $L_3$ and the infrared absorption filter F.

The objective lens system preferred as the eighteenth embodiment satisfies the conditions (1-1), (2) and (3).

For reserving a large space to disposed a filter by prolonging a back focal length in an objective lens system, it is desirable to disposed a negative power in the vicinity of an aperture stop. The eighteenth embodiment prolongs a back focal length by disposing an image side surface of the first lens component $L_1$ in the vicinity of the aperture stop.

Though the eighth embodiment described above is configured to have a long back focal length by using the concave surface as the object side surface of the second lens component $L_2$ and locating the concave surface in the vicinity of the aperture stop S on the image side, the eighth embodiment is disadvantageous from a viewpoint of workability since the second lens component $L_2$ has a meniscus shape and radii of curvature on both surfaces which have values close to each other, thereby requiring a hard centering work. The eighteenth embodiment is preferable from the viewpoint of workability since it uses a planar surface as an object side of the first lens component $L_1$.

In the eighteenth embodiment, the image side surface of the first lens component $L_1$ is configured as a surface concave toward the image side to prolong a back focal length as described above, and each of the first lens component $L_1$, the second lens component $L_2$ and the third lens component $L_3$ has a planar surface on one side so that the lens components can easily be worked even when the lens components are small.

Figure 19:
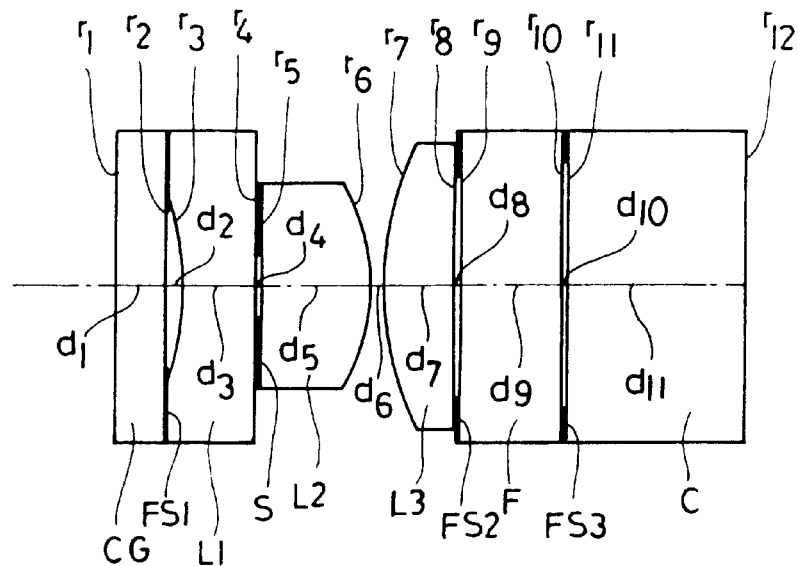
FIG. 19 is a sectional view illustrating a composition of a nineteenth embodiment of the objective lens system for endoscopes according to the present invention.

The nineteenth embodiment is a lens system having a composition illustrated in FIG. 19, and comprises, in order from the object side, a cover glass plate CG, a first negative lens component $L_1$, a second positive lens component $L_2$, a third positive lens component $L_3$, an infrared absorption filter F and a CCD cover glass plate C. Furthermore, an aperture stop S is disposed between the first lens component $L_1$ and the second lens component $L_2$, and flare stops $FS_1$, $FS_2$ and $FS_3$ are disposed between the cover glass plate CG and the first lens component $L_1$, between the third lens component $L_3$ and the infrared absorption filter F, and between the infrared absorption filter F and the CCD cover glass plate C.

The objective lens system preferred as the nineteenth embodiment satisfies the conditions (1-1), (2), (3) and (5).

The nineteenth embodiment is configured to have a long back focal length by using a concave surface as an object side surface of the first lens component $L_1$ and imparting a negative refractive power to the first lens component $L_1$. Furthermore, a surface on one side of each of the first lens component $L_1$, the second lens component $L_2$ and the third lens component $L_3$ is configured as a planar surface so that the lens components can be worked easily and smaller.

A field angle of the lens system preferred as the eighteenth embodiment may be variable due to a variation of an airspace $d_2$ between the first lens component $L_1$ and the second lens component $L_2$ which is caused due to a working variation of a planar surface portion 8 of the first lens component $L_1$ in a direction along an optical axis. The nineteenth embodiment wherein the object side surface of the first lens component $L_1$ is configured as the concave surface is free from a variation of a field angle due to working variation of a planar surface portion and allows the lens components smaller.

Figure 20:
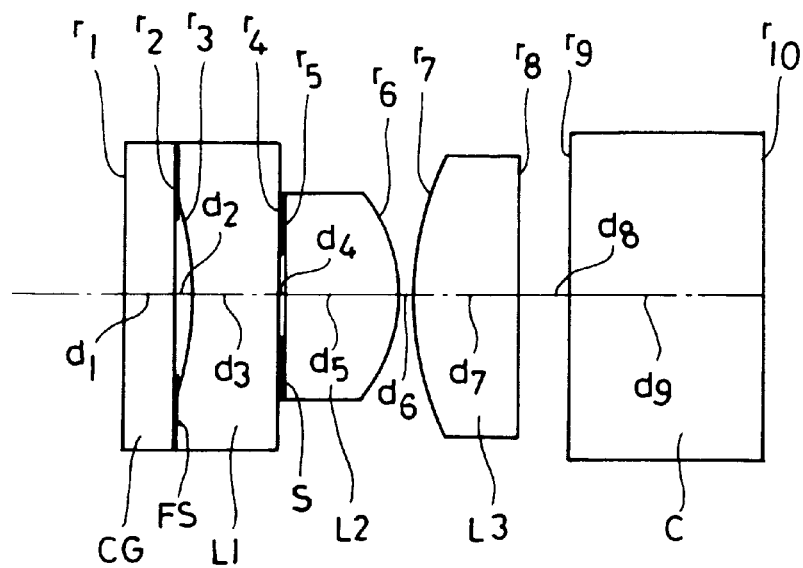
FIG. 20 is a sectional view illustrating a composition of a twentieth embodiment of the objective lens system for endoscopes according to the present invention.

The twentieth embodiment comprises, in order from the object side as shown in FIG. 20, a cover glass plate CG, a first negative lens component $L_1$, a second positive lens component $L_2$, a third positive lens component $L_3$ and a CCD cover glass plate C. The second lens component $L_2$ is made of a material which is used to compose an infrared absorption filter and serves also as an infrared absorption filter. Furthermore, an aperture stop S is disposed between the first lens component $L_1$ and the second lens component $L_2$, and a flare stop FS is disposed between the cover glass plate CG and the first lens component $L_1$.

A lens system preferred as the twentieth embodiment satisfies the conditions (5), (2) and (3).

Figure 21:
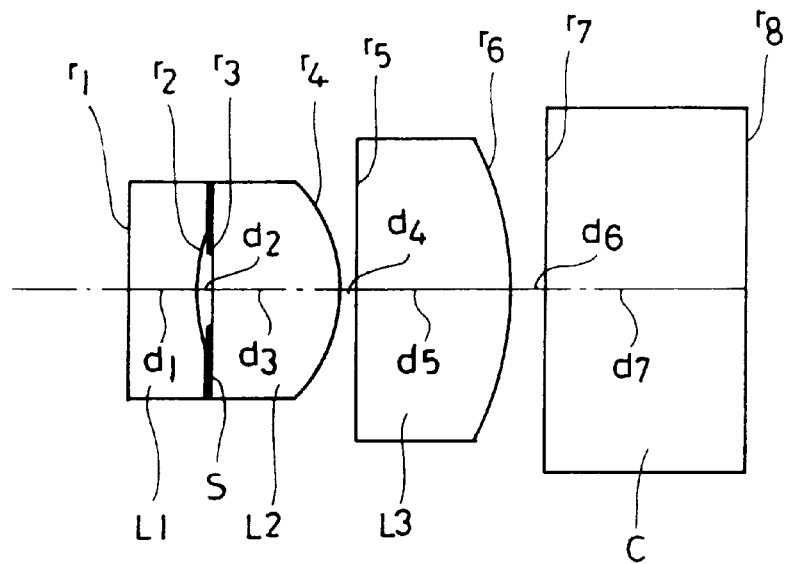
FIG. 21 is a sectional view illustrating a composition of a twenty-first embodiment of the objective lens system for endoscopes according to the present invention.

The twenty-first embodiment comprises, in order from the object side as shown in FIG. 21, a first negative lens component $L_1$, a second positive lens component $L_2$, a third positive lens component $L_3$ and a CCD cover glass plate C. Furthermore, the third lens component $L_3$ is made of a material which is used to compose an infrared absorption filter, and an aperture stop S is disposed between the first lens component $L_1$ and the second lens component $L_2$.

A lens system preferred as the twenty-first embodiment satisfies the conditions (5), (2) and (3).

Figure 22:
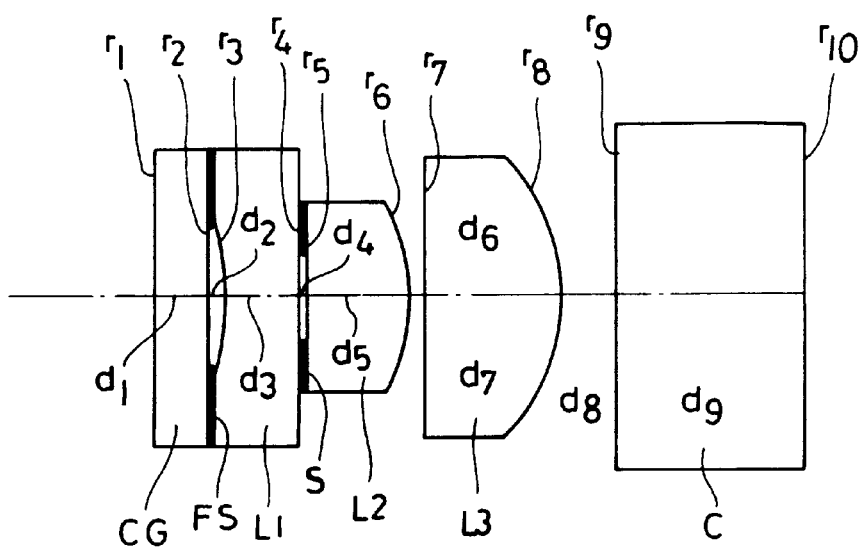
FIG. 22 is a sectional view illustrating a composition of a twenty-second embodiment of the objective lens system for endoscopes according to the present invention.
Figure 23A:
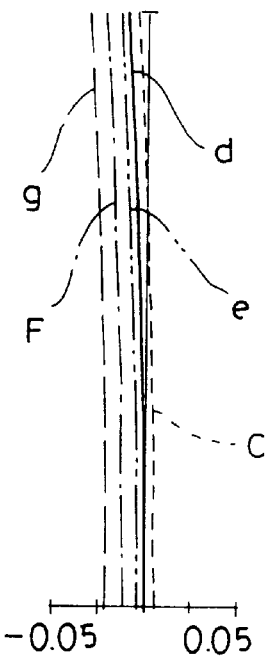
FIG. 23 is a diagram illustrating aberration characteristics of the first embodiment.
Figure 23B:
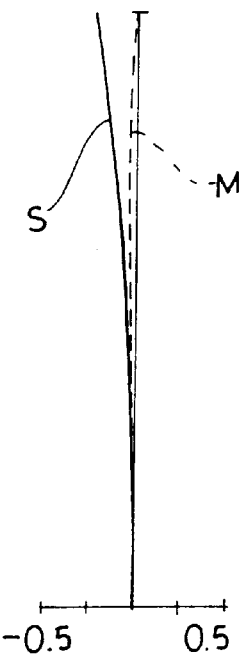
Figure 23C:
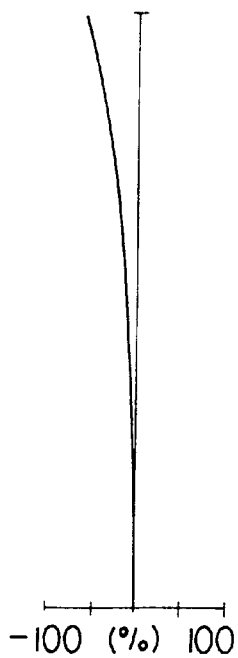
Figure 23D:
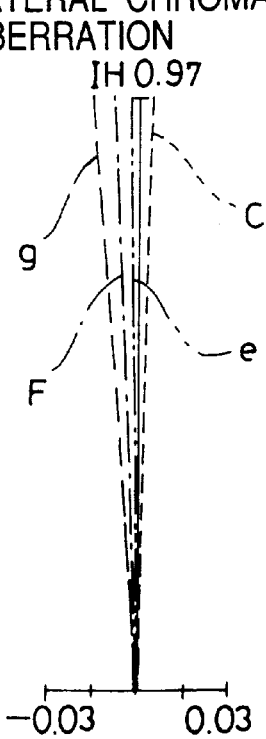
Figure 23E:
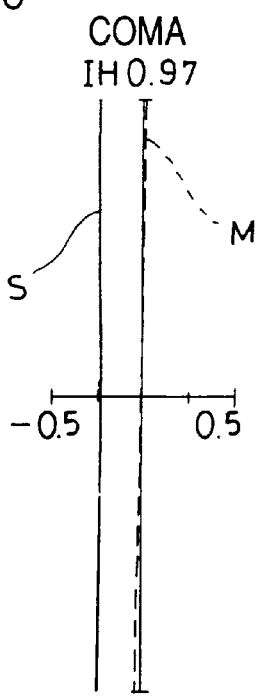

The twenty-second embodiment comprises, in order from the object side as shown in FIG. 22, a cover glass plate CG, a first negative lens component $L_1$, a second positive lens component $L_2$, a third positive lens component $L_3$ and a CCD cover glass plate C. The third lens component $L_3$ is made of a material which is used to compose an infrared absorption filter. Furthermore, an aperture stop S is disposed between the first lens component $L_1$ and the second lens component $L_2$, and a flare stop FS is disposed between the cover glass plate C and the first lens component $L_1$.

A lens system preferred as the twenty-second embodiment satisfies the conditions (5), (2) and (3).

In addition to lens systems defined by claims, lens systems which have compositions described in items mentioned blow can also accomplish the object of the present invention.

(1) The objective lens system for endoscopes defined by claim 1 and characterized in that it satisfies the following condition (2):

$$D_{23}/f<0.15 \qquad (2)$$

(2) The objective lens system for endoscopes defined by claim 1 or item (1) mentioned above and characterized in that it satisfies the following condition (3):

$$2.5<f_3/f<5 \qquad (3)$$

(3) The objective lens system for endoscopes defined by claim 1, item (1) or item (2) mentioned above and characterized in that it satisfies the following condition (4):

$$0.3<f_3/f_2<0.7 \qquad (4)$$

(4) The objective lens system for endoscopes defined by claim 3 or claim 4 and characterized in that it satisfies the following condition (2):

$$D_{23}/f<0.15 \qquad (2)$$

(5) The objective lens system for endoscopes defined by claim 3, claim 4 or item (4) mentioned above and characterized in that it satisfies the following condition (3):

$$2.5<f_3/f<5 \qquad (3)$$

(6) An objective lens system for endoscopes comprising, in order from the object side, a first lens component which has no or negative refractive power, second positive lens component and a third positive lens component, characterized in that the second lens component has a planar object side surface and a spherical convex image side surface, and satisfies the following condition (5):

$$v>45 \qquad (5)$$

(7) The objective lens system for endoscopes defined by item (6) mentioned above and characterized in that it satisfies the following condition (2):

$$D_{23}/f<0.15 \qquad (2)$$

(8) The objective lens system for endoscoopes defined by item (6) or item (7) mentioned above and characterized in that it satisfies the following condition (3):

$$2.5<f_3/f<5 \qquad (3)$$

POSSIBILITY OF INDUSTRIAL UTILIZATION

The objective lens system according to the present invention consists of a small number of lens components, has a space sufficient to dispose an infrared absorption filter and corrects lateral chromatic aberration sufficiently favorably, thereby being suited to compose a compact electronic endoscope which has a large field angle.

What is claimed is:

1. An objective lens system for endoscopes comprising in order from the object side: a first lens component which has no refractive power; a second lens component having an image side surface which is convex toward the image side; and a third lens component having an object side surface which is convex toward the object side, wherein the third lens component satisfies the following condition (1):

$$3<r_{3F}/D_3<10 \qquad (1)$$

wherein the reference symbol $r_{3F}$ represents a radius of curvature on the object side surface of the third lens component and the reference symbol $D_3$ designates a thickness of the third lens component.

2. An objective lens system for endoscopes comprising in order from the object side: a first negative lens component; a second lens component having an image side surface which is convex toward the image side; and a third lens component having an object side surface which is convex toward the object side, wherein the third lens component satisfies the following condition (1-1):

$$4.37<r_{3F}/D_3<10 \qquad (1\text{-}1)$$

wherein the reference symbol $r_{3F}$ represents a radius of curvature on the object side surface of the third lens component and the reference symbol $D_3$ designates a thickness of the third lens component.

3. An objective lens system for endosocopes comprising in order from the object side: a first lens component which has no refractive power; a second lens component having a planar object side surface and a spherical image side surface which is convex toward the image side; and a third lens component having an object side spherical surface which is convex toward the object side, wherein the objective lens system satisfies the following condition (5):

$$\nu > 45 \tag{5}$$

wherein the reference symbol ν represents an Abbe's number of the second lens component or the third lens component.

4. An objective lens system for endoscopes comprising in order from the object side: a first lens component which has no or a negative refractive power; a second positive lens component; and a third positive lens component, wherein said second lens component has an object side surface which is concave toward the object side and an image side surface which is convex toward the image side, and satisfies the following condition (5-1):

$$\nu > 53 \tag{5-1}$$

wherein the reference symbol ν represents an Abbe's number of the second lens component or the third lens component.

5. The objective lens system for endoscopes according to claim 1 or 2, wherein an infrared absorption filter is disposed on the image side of said third lens component.

6. The objective lens system for endoscopes according to claim 1 or 2, wherein a material of an optical member disposed on the most object side is sapphire.

7. An objective lens system for endoscopes comprising in order from the object side; a first lens component which has no or a negative refractive power; a second positive lens component; and a third positive lens component, wherein a material of said first lens component is sapphire.

8. An objective lens system for endoscopes comprising in order from the object side: a first lens component which has no or a negative refractive power; a second positive lens component; and a third positive lens component, wherein an infrared absorption filter is disposed on the object side of said second lens component.

* * * * *